United States Patent
Jacob et al.

(10) Patent No.: US 12,211,493 B2
(45) Date of Patent: Jan. 28, 2025

(54) EARLY INVOCATION FOR CONTEXTUAL DATA PROCESSING

(71) Applicant: Amazon Technologies, Inc., Seattle, WA (US)

(72) Inventors: Ponnu Jacob, Seattle, WA (US); Adam Kalman, Seattle, WA (US); Uday Kumar Kollu, Seattle, WA (US); Ruiqi Luo, Kenmore, WA (US); Xi Chen, Issaquah, WA (US); Jingqian Zhao, Bellevue, WA (US); Yunqiang Zhu Zhu, Sammamish, WA (US); Adriano Devillaine, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 17/304,720

(22) Filed: Jun. 24, 2021

(65) Prior Publication Data

US 2022/0415311 A1 Dec. 29, 2022

(51) Int. Cl.
| | |
|---|---|
| *G10L 15/22* | (2006.01) |
| *G06F 40/30* | (2020.01) |
| *G10L 15/18* | (2013.01) |
| *G10L 15/183* | (2013.01) |
| *G06F 40/35* | (2020.01) |

(52) U.S. Cl.
CPC .......... *G10L 15/1815* (2013.01); *G06F 40/30* (2020.01); *G10L 15/18* (2013.01); *G10L 15/183* (2013.01); *G10L 15/22* (2013.01); *G06F 40/35* (2020.01); *G10L 15/1822* (2013.01); *G10L 2015/223* (2013.01); *G10L 2015/226* (2013.01); *G10L 2015/227* (2013.01); *G10L 2015/228* (2013.01)

(58) Field of Classification Search
None
See application file for complete search history.

(56) References Cited

U.S. PATENT DOCUMENTS

| | | | |
|---|---|---|---|
| 6,964,023 B2 * | 11/2005 | Maes .................... | G06F 3/0481 704/E15.041 |
| 7,137,126 B1 * | 11/2006 | Coffman ............... | G06F 16/957 704/E15.04 |
| 8,543,407 B1 | 9/2013 | Gagnon et al. | |

(Continued)

FOREIGN PATENT DOCUMENTS

WO    WO 2022/271555    12/2022

OTHER PUBLICATIONS

International Search Report and Written Opinion in PCT Application No. PCT/US2022/034014, dated Sep. 8, 2022 in 16 pages.

*Primary Examiner* — Richard Z Zhu
(74) *Attorney, Agent, or Firm* — Knobbe, Martens, Olson & Bear, LLP

(57) ABSTRACT

A speech processing system uses contextual data to determine the specific domains, subdomains, and applications appropriate for taking action in response to spoken commands and other utterances. The system can use signals and other contextual data associated with an utterance, such as location signals, content catalog data, data regarding historical usage patterns, data regarding content visually presented on a display screen of a computing device when an utterance was made, other data, or some combination thereof.

19 Claims, 8 Drawing Sheets

(56) References Cited

U.S. PATENT DOCUMENTS

| | | | |
|---|---|---|---|
| 9,064,006 B2 | 6/2015 | Hakkani-Tur et al. | |
| 9,171,541 B2 | 10/2015 | Kennewick et al. | |
| 9,424,840 B1* | 8/2016 | Hart | G10L 15/22 |
| 9,691,384 B1* | 6/2017 | Wang | G10L 15/18 |
| 9,858,923 B2 | 1/2018 | Wasserblat et al. | |
| 9,858,925 B2* | 1/2018 | Gruber | G10L 15/18 |
| 9,922,642 B2* | 3/2018 | Pitschel | G10L 15/063 |
| 10,096,316 B2* | 10/2018 | Kalns | G10L 15/18 |
| 10,229,680 B1* | 3/2019 | Gillespie | G06F 40/295 |
| 10,515,625 B1* | 12/2019 | Metallinou | G10L 15/26 |
| 10,629,186 B1* | 4/2020 | Slifka | G10L 15/1815 |
| 10,726,831 B2* | 7/2020 | Di Fabbrizio | G10L 15/18 |
| 11,037,562 B2* | 6/2021 | Shah | G06F 3/167 |
| 11,222,630 B1 | 1/2022 | Soni et al. | |
| 11,276,395 B1 | 3/2022 | Jones et al. | |
| 11,302,312 B1 | 4/2022 | Soni et al. | |
| 11,527,238 B2 | 12/2022 | Meng et al. | |
| 11,631,017 B2* | 4/2023 | White | G06N 5/043 706/49 |
| 11,657,805 B2 | 5/2023 | Jacob et al. | |
| 11,657,807 B2 | 5/2023 | Jacob et al. | |
| 11,705,113 B2 | 7/2023 | Jacob et al. | |
| 11,830,497 B2 | 11/2023 | Jacob et al. | |
| 2003/0112277 A1 | 6/2003 | Shteyn | |
| 2010/0217604 A1 | 8/2010 | Baldwin et al. | |
| 2014/0244266 A1* | 8/2014 | Brown | G06F 3/167 715/764 |
| 2016/0259775 A1* | 9/2016 | Gelfenbeyn | G06F 40/35 |
| 2017/0060848 A1 | 3/2017 | Liu et al. | |
| 2019/0080685 A1* | 3/2019 | Johnson, Jr. | G06Q 30/0256 |
| 2019/0206405 A1* | 7/2019 | Gillespie | G06Q 30/0201 |
| 2019/0324780 A1 | 10/2019 | Zhu et al. | |
| 2019/0347604 A1 | 11/2019 | Suenram | |
| 2019/0348041 A1 | 11/2019 | Cella et al. | |
| 2020/0051560 A1 | 2/2020 | Yi et al. | |
| 2020/0175118 A1* | 6/2020 | Mahajan | G10L 17/22 |
| 2020/0257857 A1 | 8/2020 | Peper et al. | |
| 2021/0183366 A1 | 6/2021 | Reinspach et al. | |
| 2021/0256967 A1* | 8/2021 | Iacobelli | G10L 15/30 |
| 2022/0036886 A1* | 2/2022 | Iacobelli | G10L 15/22 |
| 2022/0270606 A1 | 8/2022 | Jones et al. | |

\* cited by examiner

EARLY INVOCATION FOR CONTEXTUAL DATA PROCESSING

CROSS-REFERENCE TO CONCURRENTLY-FILED APPLICATIONS

This application is being filed concurrently with the following U.S. Applications, each of which is incorporated herein by reference in its entirety.

| U.S. App. No. | Title | Filing Date |
| --- | --- | --- |
| 17/357,338 | MULTI-TIER SPEECH PROCESSING AND CONTENT OPERATIONS | Jun. 24, 2021 |
| 17/357,025 | MULTI-DOMAIN INTENT HANDLING WITH CROSS-DOMAIN CONTEXTUAL SIGNALS | Jun. 24, 2021 |
| 17/304,712 | PRIORITY AND CONTEXT-BASED ROUTING OF SPEECH PROCESSING | Jun. 24, 2021 |
| 17/304,714 | DYNAMIC CONTEXT-BASED ROUTING OF SPEECH PROCESSING | Jun. 24, 2021 |

BACKGROUND

Electronic devices, such as voice-enabled electronic devices, are capable of performing various functions. For instance, an individual may speak a command to activate such a device, and in response the device may perform various functions and/or cause one or more actions to be performed. Some voice-enabled electronic devices may communicate with a network-accessible system for processing of spoken commands, performance of functions, and the like.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
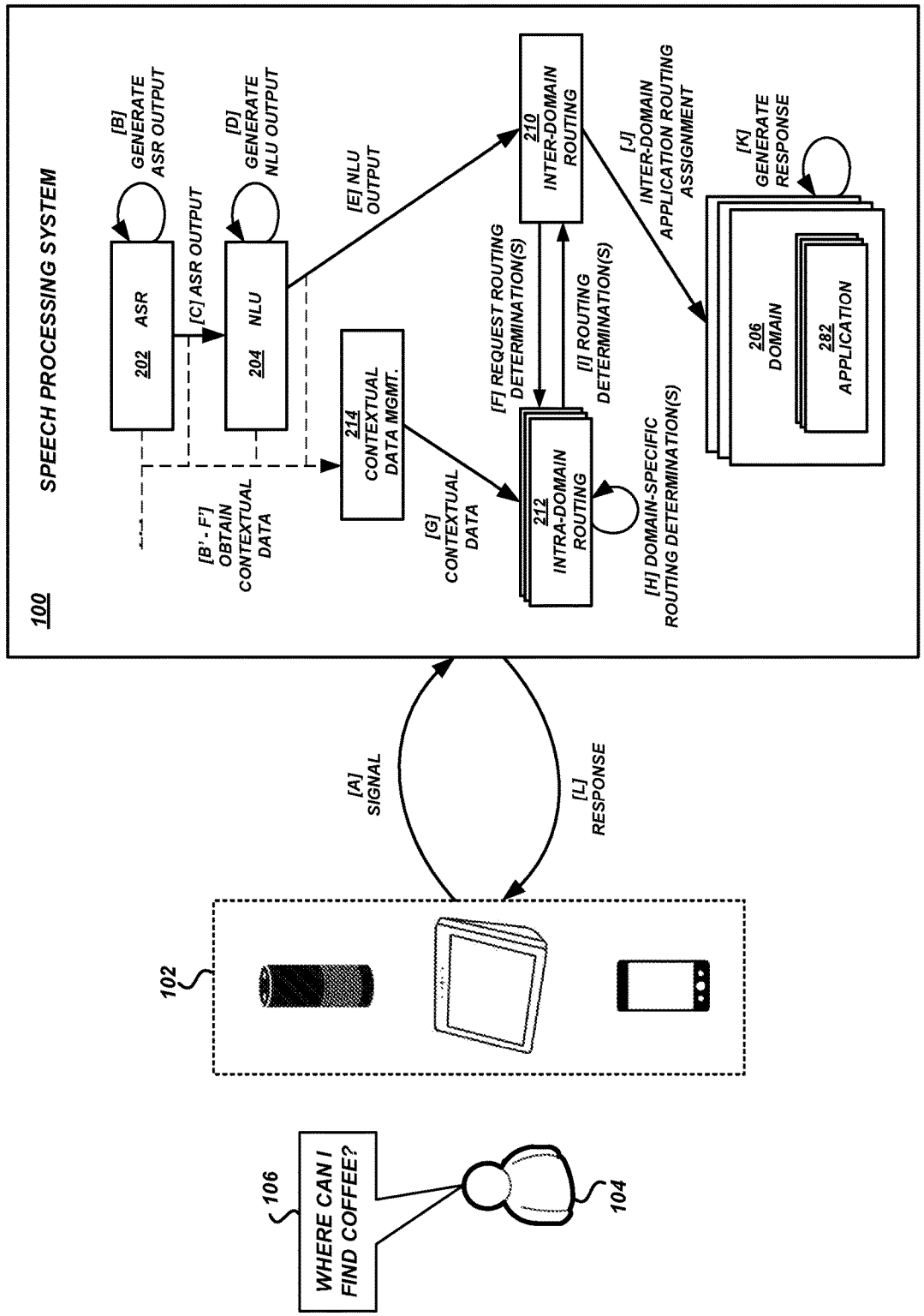
FIG. 1 is a block diagram showing data flows an interactions between systems and components of an illustrative networked speech processing environment according to some embodiments.

The present disclosure is directed to a system that uses contextual data to determine the specific domains, subdomains, and intent processing applications appropriate for taking action in response to spoken commands and other utterances. In some embodiments, the system can use signals and other contextual data associated with an utterance, such as location signals, content catalog data, data regarding historical usage patterns, data regarding content visually presented on a display screen of a computing device when an utterance was made, other data, or some combination thereof. By incorporating contextual data into the routing decisions for responding to—or otherwise taking action on—potentially ambiguous spoken utterances, a speech processing system can provide an improved user experience in terms of user-perceived latency and success in accomplishing the users' interaction goals.

Some speech processing systems process utterances by generating transcripts or other textual representations of the utterances using automatic speech recognition ("ASR"), and then analyzing the textual representations to determine their meaning using natural language understanding ("NLU"). The systems then perform one or more actions based on the determined meanings of the utterances. However, some utterances may be ambiguous and may reasonably be interpreted as requests for performance of any number of different actions, and some actions may be appropriately performed in any number of different manners and/or by any number of applications. Some speech processing systems attempt to account for such ambiguity through the use of contextual data to aid in determining the meaning of an utterance. The utterance may then be routed to an application for performance of an action associated with the determined meaning. However, such systems may not have access to all relevant contextual data at the time the initial utterance meaning is determined or may not otherwise be capable of considering all relevant contextual data during utterance meaning determination. For these reasons, among others, the systems may not accurately determine the most appropriate actions to be performed or otherwise most appropriate applications for performance of the actions. Moreover, new actions and applications cannot be integrated into the system, and new contextual data cannot be accounted for and considered, without changes to the underlying NLU processing.

Some aspects of the present disclosure address the issues noted above, among others, by providing context-aware routing of utterances to particular domains and domain-specific applications for processing. In some embodiments, a speech processing system implements utterance processing using a set of domains. Generally described, a domain is a collection of applications (also referred to as "experience provider services," "experience providers," or "services") each configured to respond to utterances associated with a particular utterance subject matter, such as a particular subset of voice commands and other intents the speech processing system is capable of understanding. A response to an utterance may include automatically executing a function, engaging in a multi-turn spoken dialog, other actions, or some combination thereof. For example, one domain may be a shopping domain configured to process all manner of shopping related commands and queries. Another domain may be a media content management service on which a user accesses media content that they own, license, or access third party media. Yet another domain may be a communication domain configured to initiate phone calls and generate emails, etc. The specific actions that are performed by the domains in response to utterances may be handled by specialized applications implemented as combinations of software and hardware. Segregating the functionality of the speech processing system into domains can allow for easier addition and modification of the universe of commands and queries that the speech processing system is capable of accepting. However, in such a configuration, routing utterances to the proper domain—or to the proper application within a given domain—becomes an important task because applications of one domain may be unable to adequately process utterances associated with the subject matter of another domain. In addition, some domains may be large and may be organized into subdomains in any number of tiers. In such cases, routing an utterance to the proper subdomain may present additional complexity.

To improve the routing of utterances to particular domains, subdomains, and applications, an intra-domain routing system may employ any number of subdomain-specific and/or application-specific confidence providers to obtain assessments of which subdomains and/or applications (if any) are appropriate destinations for a particular utterance. For example, an ASR system may generate text data representing a transcript or set of words in an utterance, and an NLU system can then generate an N-best list (where N is a positive integer) of interpretations of the utterance that the speech processing system is configured to process. The interpretations of the utterance may also be referred to as "intents." The domains associated with one or more of the N-best intents may be identified and requested to indicate whether they are capable of adequately handling the intent(s). Within a particular domain, the subdomain and/or application specific confidence providers associated with the intent(s) may be requested to provide an assessment of the likelihood that the corresponding subdomains and/or applications are the proper entity for responding to the utterance.

The assessments of the confidence providers may be based not only on the utterance itself (e.g., the NLU-generated intent, ASR-generated text data, etc.), but also on contextual data associated with the utterance. For example, a domain may be a shopping domain configured to process all manner of shopping related commands and queries. The shopping domain may have any number of intent processing applications, which may or may not be separated into any number of subdomains, including a first subdomain associated with finding products in a particular store and a second subdomain associated with purchasing products online. When a user says "find me product X," the proper entity for handling this utterance may depend on contextual data associated with the utterance, such as the user's geographic location: if the user is at the particular store, then the proper entity may be the first subdomain and/or application, while if the user is at home, then the proper entity may be the second subdomain and/or application. The confidence providers can be provided with contextual data indicating the user's geographic location, and the confidence providers may produce different assessments for different users and/or different utterances depending upon the user's geographic location at the time of the utterance. Advantageously, consideration of contextual information during the routing confidence evaluations is separate from consideration of contextual information (if any) during NLU intent determinations, and may include additional contextual information and/or altogether different contextual information.

Additional aspects of the present disclosure relate to proactively obtaining and managing contextual information during utterance processing for use in subsequent routing determinations, response generation operations, and other downstream processes. A contextual data management system may be integrated at various points into the process of receiving and processing an utterance to generate intents. As data is generated, accessed, or otherwise becomes available during utterance processing, the contextual data management system can identify and obtain the contextual data that is to be used in routing confidence evaluations. The obtained contextual data can be stored, processed, used to generate and/or obtain additional contextual data, etc. In some embodiments, the contextual data management system may maintain a registry of contextual data items to be obtained, the points of integration at which the contextual data items are to be obtained, the processing/storage/etc. to be performed using the contextual data, which routing confidence evaluations use the contextual data items, etc. For example, the registry may indicate that one contextual data item may become available at a particular point during utterance processing, and is to be used as input into a calculation or evaluated by a model to produce a particular value that is to be considered during a routing confidence evaluation. As another example, the registry may indicate that another contextual data item may become available at another point during utterance processing, and is to be stored for consideration during another routing confidence evaluation. The registry may define any number and combination of such contextual data item acquisition processes, and the contextual data management system may use the registry to acquire the contextual data items and make them available for routing confidence evaluations. In some embodiments, the registry may associate contextual data items with particular confidence providers.

Various aspects of the disclosure will now be described with regard to certain examples and embodiments, which are intended to illustrate but not limit the disclosure. Although aspects of some embodiments described in the disclosure will focus, for the purpose of illustration, on particular examples of utterances, intents, applications, routing determinations and contextual data items, the examples are illustrative only and are not intended to be limiting. In some embodiments, the techniques described herein may be applied to additional or alternative utterances, intents, applications, routing determinations and contextual data items, and the like.

Speech Processing Environment

FIG. 1 is a schematic diagram of an illustrative network environment in which a user 104 makes an utterance 106, one or more voice-enabled devices 102 detect the utterance 106, and a speech processing system 100 determines the meaning of—and performs an action in response to—the utterance 106.

In some embodiments, the voice-enabled device 102 may have one or more microphones that are used to capture user speech, such as the utterance 106, one or more speakers that are used to play speech (e.g., computer-synthesized dialogue) or other content, one or more displays that are used to present content, etc. The voice-enabled device 102 may also be referred to as a user computing device or a user device. In some embodiments, the voice-enabled device 102 may be portable or mobile. For example, the voice-enabled device 102 may be a handheld device or other mobile device such as a mobile phone or tablet computer. In some embodiments, the voice-enabled device 102 may be designed to operate from a relatively fixed location. For example, the voice-enabled device may be a speaker configured with audio input capabilities and network access (e.g., a "smart speaker"), a screen configured with audio input capabilities and network access (e.g., a "smart display"), or some other electronic device.

The speech processing system 100 may process audio signals received from the voice-enabled device 102 and formulate responses to the user 104. The speech processing system 100 may include various components for providing the features described herein. In some embodiments, the speech processing system 100 may include an ASR system 202 to process audio signals or other audio data and generate text data representative of user utterances. The speech processing system 100 may also include an NLU system 204 to process text data and generate semantic representations of user utterances. The speech processing system 100 may also include a system of domains 206 that each include or manage one or more applications 282 to respond or otherwise act on user utterances, such as by providing requested content, performing requested operations, and the like. Advantageously, individual domains 206 (or certain subsets thereof) may be associated with a corresponding intra-domain routing system 212 to determine whether particular utterance meaning hypotheses, generated by the NLU system 204, are able to be handled by applications 282 of the corresponding domain 206. The speech processing system 100 may also include a contextual data management system 214 to manage the acquisition, generation, and provision of contextual data to the intra-domain routing system(s) 212 for use in making routing determinations, generating responses, etc. The determinations made by the intra-domain routing systems 212 may be used by a inter-domain routing system 210 to manage the routing of utterances to individual domains 206 or applications 282.

Figure 2:
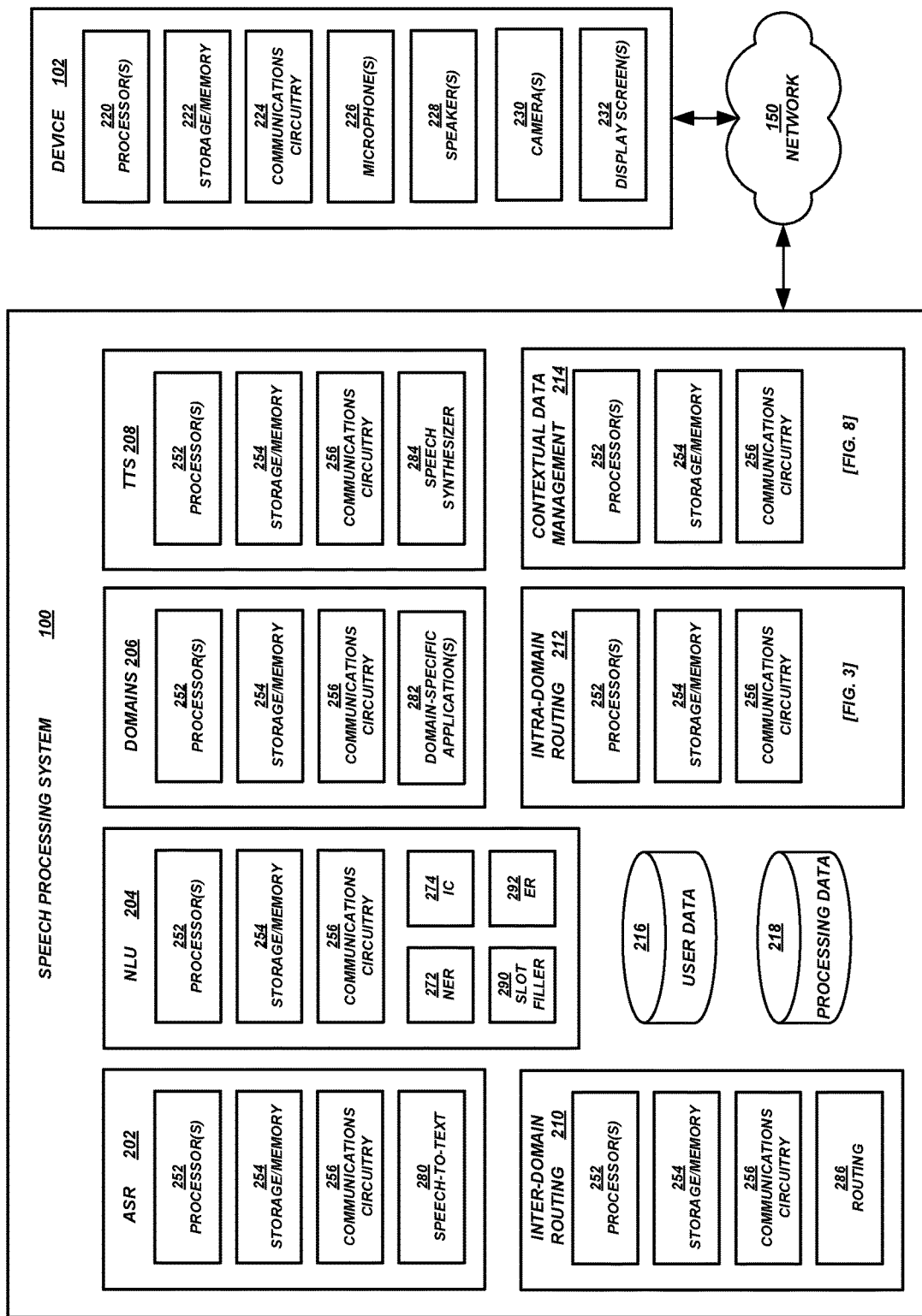
FIG. 2 is a diagram of an illustrative architecture of systems shown of FIG. 1 according to some embodiments.

The example systems and components of the speech processing system 100 shown in FIG. 1 are illustrative only, and are not intended to be limiting. In some embodiments, a speech processing system 100 may have fewer, additional, and/or alternative components and data stores. A specific, detailed example embodiment of the speech processing system 100 is shown in FIG. 2 and described in greater detail below.

The speech processing system 100 may be implemented on one or more physical server computing devices that provide computing services and resources to end-user devices, such as voice-enabled devices 102. In some embodiments, the speech processing system 100 (or individual components thereof, such as the ASR system 202, NLU system 204, domain systems 206, inter-domain routing system 210, intra-domain routing systems 212, contextual data management system 214, etc.) may be implemented on one or more host devices, such as blade servers, midrange computing devices, mainframe computers, desktop computers, or any other computing device configured to provide computing services and resources. For example, a single host device may execute one or more ASR systems 202, NLU systems 204, domain systems 206, inter-domain routing system 210, intra-domain routing systems 212, contextual data management system 214, some combination thereof, etc. The speech processing system 100 may include any number of such hosts.

In some embodiments, the features and services provided by the speech processing system 100 may be implemented as web services consumable via one or more communication networks. In further embodiments, the speech processing system 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

As shown in FIG. 1, a user 104 may interact with a voice-enabled device 102 using an utterance 106. The voice-enabled device 102 may detect sound corresponding to the utterance 106 of the user via one or more microphones. In certain implementations, the utterance 106 may include or be preceded by a wakeword or other trigger expression or event (e.g., "Computer!") that is spoken by the user 104 to indicate that subsequent user speech (e.g., "Where can I find coffee?") is device-directed speech (e.g., speech intended to be received and acted upon by the voice-enabled device 102 and/or speech processing system 100). The voice-enabled device 102 may detect the wakeword and begin streaming audio signals to the speech processing system 100. In some instances, the voice-enabled device 102 may operate in a low-functionality mode and analyze sound using ASR processing. When the wakeword is detected (e.g., using ASR, keyword spotting, etc.), the voice-enabled device 102 may begin streaming the audio signal (and, optionally, other data) to the speech processing system 100. The wakeword may be a reserved keyword that is detected locally by the voice-enabled device 102, such as by using an expression detector that analyzes audio signals produced by the microphones of the voice-enabled device 102 to detect the wakeword, which generally may be a predefined word, phrase, or other sound. Such an expression detector may be implemented using keyword spotting technology, as an example.

In the example illustrated in FIG. 1, the user 104 issues an utterance 106 subsequent to a wakeword, which the voice-enabled device 102 captures. The voice-enabled device 102 may produce an audio signal representing the utterance 106. As shown, the voice-enabled device 102 may send the audio signal to the speech processing system 100. In some embodiments, the voice-enabled device 102 may further determine and/or generate, and send additional metadata to the speech processing system 100 that may be used to determine various terms in the utterance 106. For instance, the types of metadata may include data regarding the information currently displayed on a display component (or some other display), sensor data representing the current location and/or environment of the voice-enabled device 102, snapshots which indicate device states of the voice-enabled device 102, data about the voice-enabled device 102 (e.g., unique identifier, version), etc. Data regarding the information currently displayed may include identifiers of content items currently displayed on screen, identifiers of items displayed in a list, etc. Sensor data may comprise data generated by various sensors and other components of the voice-enabled device, such as data representing geolocation, ambient temperature, ambient lighting, device orientation, device motion, and the like. A snapshot may comprise device states which indicate current operations of the voice-enabled device 102 before, during, and/or after the utterance 106 is detected by the voice-enabled device 102. Device states of the voice-enabled device 102 may represent actions such as, for example, conducting a telephone call, outputting an alarm sound, streaming audio (e.g., music, audio books, etc.), conducting a dialogue with user 104, performing online searches, controlling appliances in a house, or any other type of activity for which a voice-enabled device 102 can be configured to perform. Data about the voice-enabled device 102 may include a device identifier, a version identifier, data regarding components and/or capabilities of the voice-enabled device 102 (e.g., whether the device has a display screen, a touch screen, a speaker, a microphone, a keyboard, etc.), data regarding a network connection available to the voice-enabled device 102, geolocation or local location data regarding the location of the voice-enabled device 102, etc.

While the snapshots of the device states may be sent to the speech processing system 100 when an utterance is detected 106, in other examples, the speech processing system 100 may also store indications of device states rather than receiving them each time an audio signal is received. For example, the speech processing system 100 may receive an indication that the user 104 set an alarm, and know what time the alarm will sound. Thus, once the alarm is sounding, the speech processing system 100 may already have the device state stored and does not receive the snapshots every time an utterance 106 is detected. Similarly, some or all of the metadata may be stored at the speech processing system 100 prior to the utterance 106 being captured by the voice-enabled device 102.

With reference to an illustrative example, the user 104 may make an utterance 106 such as "Where can I find coffee?" At [A], an audio signal representing the user's utterance 106 may be transmitted to the speech processing system 100 for processing and responsive action. Based only on the spoken words, the utterance 106 may be ambiguous: it could be a query for a physical coffee shop nearby; it could be a query for the location of coffee within a physical store; it could be a query for an online purchase of coffee. Each of these interpretations, and potentially others, may be plausible. Conventional systems may rank the possible interpretations, select the top-ranked interpretation, and route the query to an application for performance of an associated action. However, without considering contextual data associated with the utterance, the routing of the query to an application may not be appropriate. For example, if a user is in a store that sells coffee, the second interpretation (it is a query for the location of coffee within a physical store) may be the most likely correct interpretation, while if a user is at home looking at a shopping web site, the third interpretation (it is a query for an online purchase of coffee) may be the most likely correct interpretation. Different applications may be used perform actions in response to these different interpretations. By considering contextual information such as the current location of the user, the user's current activities and/or interactions with the voice-enabled device 102, etc., the system 100 can make dynamic routing determinations that vary from user-to-user, and even from query-to-query even when received from the same user.

At [B], the ASR system 202 can generate ASR results using the audio signal. Illustratively, the ASR results may include one or more transcripts or other sets of text data representative of words in the utterance 106. In some examples, the ASR system 202 may generate ASR confidence score data representing the likelihood that a particular set of words of the textual data matches those spoken in the utterance 106. For instance, the ASR system 202 may determine a score representing a confidence or likelihood that a particular word which matches the sounds would be included in the sentence at the specified location (e.g., using a language or grammar model). Thus, each potential textual interpretation of the spoken utterance 106 (hypothesis) is associated with an ASR confidence score. The ASR system 202 may send the ASR results to the NLU system 204 at [C].

At [D], the NLU system 204 may generate NLU results data, such as a semantic representation of the utterance 106, using the obtained ASR results. In the present example, as described above, the utterance "Where can I find coffee?" may reasonably be interpreted as a query for a location of a physical coffee shop, a query the location of coffee within a physical store, a query for coffee in an online store, etc. The NLU system 204 may generate an N-best list of interpretations, including any or all of these interpretations and potentially others. The NLU system 204 may provide the NLU results to the inter-domain routing system 210 at [E].

At [B'], the contextual data management system 214 may obtain and/or generate contextual data at various integration points throughout the intake, ASR, and NLU processes. The acquisition of contextual data is shown using the label [B'-F'] to indicate the parallel or otherwise asynchronous operation with respect to other processes shown and described, including those labeled [B]-[F]. For example, the contextual data management system 214 may obtain geolocation data representing the current geographic location of the voice-enabled device 102. This data may be obtained by the system 100 with the audio signal at [A] and then provided to the contextual data management system 214, requested by the system 100 after receipt of the audio signal and then provided to the contextual data management system 214, or otherwise obtained by the contextual data management system 214. In some embodiments, the geolocation data may be obtained by the contextual data management system 214 in parallel with ASR processing at [B], provision of ASR results at [C], NLU processing [D], provision of NLU results at [E], or at some other time (e.g., the data may be available from processing a prior utterance). The contextual data management system 214 may obtain and/or generate other contextual data items before, in parallel with, or after ASR processing at [B], provision of ASR results at [C], NLU processing [D], provision of NLU results at [E], and/or at various other times (e.g., during processing of a prior utterance). For example, the contextual data management system 214 may obtain data regarding content being presented by the voice-enabled device 102 when the utterance 106 was made (e.g., web pages, list items, etc.), partial or complete ASR results, partial or complete NLU results, etc. As another example, the contextual data management system 214 may perform operations based on the ASR and/or NLU results, such as determining a difference in scoring between top-ranked NLU results, performing initial classification of the utterance 106 as being related or unrelated to a prior interaction with the system 100, generating encodings of portions of partial NLU results, etc. These contextual data items may be stored or otherwise made accessible to routing confidence providers for use in routing determinations and/or generating a response to the utterance.

At [F], the inter-domain routing system 210 can determine the domain(s) from which to generate a request for evaluation of routing confidence (e.g., a request for a determination regarding whether the domain or an application thereof is the proper entity to respond to the utterance). This request may be referred to as a "confidence request" or a "fulfillment request."

In some embodiments, the inter-domain routing system 210 may maintain or otherwise have access to a mapping of which domain(s) are configured to handle or are otherwise associated with which intent(s) that the NLU system 204 is configured to generate. The inter-domain routing system 210 may receive a list of one or more intents from the NLU system 204 for the current utterance 106, such as an N-best list. The inter-domain routing system 210 may iterate through the N-best list, or a portion thereof, and use the mapping to identify the domain(s) associated with the intent(s). The inter-domain routing system 210 may then generate a confidence request for each identified domain, and send the request to the intra-domain routing system 212 associated with each identified domain. A confidence request may include intent data representing one or more intents mapped to the domain to which the request is sent. The request may include additional information, such as score or ranking data indicating the relative likelihood that the intent is the proper intent as judged by the NLU system 204.

In the present example, an N-best list of three intents may be provided to an intra-domain routing system 212 for a shopping domain: one intent that corresponds to a query for a location of a physical coffee shop, one intent that corresponds to a query for the location of coffee within a physical store, and one intent that corresponds to a query for coffee in an online store. Additional intents may be provided to one or more other intra-domain routing systems 212 for other domains. For example, the N-best list of intents that is received by the inter-domain routing system 210 at [E] may include the three intents for the shopping domain described above, an intent for a hospitality domain (e.g., to find out if there is coffee in a hotel room), an intent for a video content domain (e.g., to find a video with the word "coffee" in the title). The inter-domain routing system 210 can generate confidence requests for those other two domains in addition to the confidence request generated for the shopping domain. In some embodiments, the confidence requests sent to the intra-domain routing systems 212 for the different domains may be made and/or handled serially, or in some embodiments the requests may be made and/or handled in parallel or otherwise asynchronously.

At [G], the intra-domain routing system 212 in receipt of each confidence request can obtain contextual data for use in routing confidence evaluations. Contextual data may include, but is not limited to: data regarding prior utterances of the current session, data regarding utterances of prior sessions, data regarding items presented on a screen when the current utterance was made, data regarding the domain(s) associated with the items presented on a screen when the current utterance was made, data regarding entities recognized during NLU processing, data regarding entities resolved during NLU processing, data regarding user feedback during the current or prior session, data regarding the purchase history of the user, data regarding the interaction history of the user, data regarding specified or learned user preferences, data regarding user accessibility history and/or preferences, geolocation data, data regarding device capabilities, data regarding device properties, data regarding user digital content library items, data regarding user subscriptions, data regarding user purchase history, gazetteer data regarding presence and/or absence of domain terms, other data, or some combination thereof. The example contextual data items described herein are illustrative only, and are not intended to be limiting, required, or exhaustive.

In the present example, the intra-domain routing system 212 for the shopping domain may obtain location data representing the geographic location of the voice-enabled device 102. As another example, the intra-domain routing system 212 for the shopping domain may obtain data representing content displayed on a screen of the voice-enabled device 102 when the utterance 106 was made.

At [H], the intra-domain routing system 212 in receipt of each confidence request can generate one or more routing confidence evaluations. In some embodiments, an intra-domain routing system 212 may employ any number of application-specific confidence providers to obtain assessments of which subdomains (e.g., applications) are appropriate destinations for a particular utterance. For example, the intra-domain routing system 212 for the shopping domain may request routing confidence evaluations from each of three application-specific routing confidence providers: a first routing confidence provider for the physical store locator application, a second confidence provider for an in-store product locator application, and a third routing confidence provider for an online shopping application. Requests for routing confidence evaluations may be made and/or handled serially, or in some embodiments the requests may be made and/or handled in parallel or otherwise asynchronously. In some embodiments, requests for routing confidence evaluations may include the various contextual data items, if any, used by the respective application-specific routing confidence providers. For example, the routing confidence provider for the physical store locator and the in-store product locator application may receive contextual data representing the geographic location of the voice-enabled device 102, while the routing confidence provider for the online shopping application may receive contextual data representing the geographic location and also the content (if any) displayed by the voice-enabled device 102 when the utterance 106 occurred.

In some embodiments, a routing confidence evaluation may be a confidence score representing the confidence of the respective provider that the application associated with provider is the proper application to handle the intent. The score may be determined using deterministic rules, a statistical model, or a combination thereof. The routing confidence evaluations may be provided to the inter-domain routing system 210 at [I].

In the present example, the routing confidence provider for the in-store aisle location application may apply a set of deterministic rules and/or a statistical model to the associated intent (e.g., a "get-aisle-location" intent) and contextual data (e.g., geographic data indicating that the user is in a particular store that offers voice-enabled product location). This routing confidence provider may generate a confidence score that is relatively high, indicating a high confidence that an in-store aisle location application is the proper application to handle the intent. The routing confidence provider for the physical store locator application may apply a set of deterministic rules and/or a statistical model to the associated intent (e.g., an on-the-go store location intent) and contextual data (e.g., geographic data indicating that the user is in the particular store noted above). This routing confidence provider may generate a confidence score that is relatively moderate, indicating a moderate confidence that a physical store locator application is the proper application to handle the intent. The routing confidence provider for the online shopping application may apply a set of deterministic rules and/or a statistical model to the associated intent (e.g., an "browse-online-item" or "purchase-item" intent) and contextual data (e.g., geographic data indicating that the user is in the particular store noted above, and content other than an online shopping site or application is displayed by the voice-enabled device 102 when the utterance 106 occurred). This routing confidence provider may generate a confidence score that is relatively low, indicating a low confidence that an online shopping application is the proper application to handle the intent.

In some embodiments, the intra-domain routing system 212 may compare or otherwise analyze the various routing confidence evaluations (e.g., confidence scores) generated by the routing confidence providers. Based on the analysis, the intra-domain routing system 212 can determine which application of the domain, if any, is likely the best application to handle the intent. In the present example, the intra-domain routing system 212 may determine that the in-store aisle location application is the best application of the shopping domain to handle the intent.

At [J], the inter-domain routing system 210 can determine a domain, subdomain, and/or application assignment based on the routing confidence evaluations received from one or more intra-domain routing systems 212. In the present example, the spoken query of "Where can I find coffee?" may be routed to the in-store aisle location application based on the relatively high confidence score associated with that application in comparison with the other confidence scores for other applications.

At [K], the assigned application 282 may generate a response to the utterance 106. The response may include: executing a function, generating a synthesized spoken response, generating a visual response, performance of some other action, or any combination thereof. For example, executing a function may include initiating a purchase transaction. Generating a synthesized response may include providing requested information in audio form. Generating a visual response may include displaying requested information on a visual display. In the present example, the response may be a synthesized spoken response (e.g., "Coffee is in aisle 20"), a visual response (e.g., a map of the store with the location of the coffee highlighted), or a combination thereof.

At [L], the speech processing system 100 can transmit the generated response, if any, to the voice-enabled device 102, and the voice-enabled device may present the response as needed.

Turning now to FIG. 2, various examples of components of an embodiment of the voice-enabled device 102 and an embodiment of the speech processing system 100 architecture of FIG. 1 will be described.

A voice-enabled device 102 may correspond to any suitable type of electronic device including, but are not limited to, desktop computers, mobile computers (e.g., laptops, ultrabooks), mobile phones, smart phones, tablets, televisions, set-top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, eyewear, headsets, etc.), and/or smart accessories (e.g., light bulbs, light switches, electrical switches, etc.). In some embodiments, a voice-enabled device 102 may be relatively simple or basic in structure such that no, or a minimal number of, mechanical input option(s) (e.g., keyboard, mouse, track pad) or touch input(s) (e.g., touch screen, buttons) are included. For example, a voice-enabled device 102 may be able to receive and output audio, and may include power, processing capabilities, storage/memory capabilities, and communication capabilities. However, in other embodiments, a voice-enabled device 102 may include one or more components for receiving mechanical inputs or touch inputs, such as a touch screen and/or one or more buttons.

A voice-enabled device 102, in one embodiment, may include a minimal number of input mechanisms (e.g., a power on/off switch) such that functionality of a voice-enabled device 102 may solely or primarily be through audio input and audio output. For example, a voice-enabled device 102 may include, or be in communication with, one or more microphones that listen for a wakeword by continually monitoring local audio. In response to the wakeword being detected, a voice-enabled device 102 may establish a connection with speech processing system 100, send audio data to speech processing system 100, and await/receive a response from speech processing system 100. In some embodiments, however, non-voice/sound enabled devices may also communicate with speech processing system 100. For example, in response to a button or touch screen being pressed, or a button or touch screen being pressed and held, a microphone associated with a voice-enabled device 102 may begin recording local audio, establish a connection with speech processing system 100, send audio data representing the captured audio to speech processing system 100, and await/receive a response, and/or action to be occur, from speech processing system 100.

The voice-enabled device 102 may include one or more processors 220, storage/memory 222, communications circuitry 224, one or more microphones 226 or other audio input devices (e.g., transducers), one or more speakers 228 or other audio output devices, one or more cameras 230 or other image capturing components, and a display component 232. However, one or more additional components may be included within a voice-enabled device 102, and/or one or more components may be omitted. For example, a voice-enabled device 102 may also include a power supply or a bus connector. As still yet another example, a voice-enabled device 102 may include one or more additional input and/or output mechanisms, such as one or more sensors, one or more buttons, or one or more switches or knobs. Furthermore, while a voice-enabled device 102 may include multiple instances of one or more components, for simplicity only one of each component has been shown.

In some embodiments, a voice-enabled device 102 may correspond to a manually activated device, or may include the functionality of a manually activated device. A manually activated device, as described herein, may correspond to a device that is capable of being activated in response to a manual input (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed.

Processor(s) 220 may include any suitable processing circuitry capable of controlling operations and functionality of a voice-enabled device 102, as well as facilitating communications between various components within a voice-enabled device 102. In some embodiments, processor(s) 220 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 220 may include its own local memory, which may store program systems, program data, and/or one or more operating systems. However, processor(s) 220 may run an operating system ("OS") for a voice-enabled device 102, and/or one or more firmware applications, media applications, and/or applications resident thereon. In some embodiments, processor(s) 220 may run a local client script for reading and rendering content received from one or more websites. For example, processor(s) 220 may run a local JavaScript client for rendering HTML or XHTML content received from a particular URL accessed by a voice-enabled device 102.

Storage/memory 222 may include one or more types of storage mediums such as any volatile or non-volatile memory, or any removable or non-removable memory implemented in any suitable manner to store data for a voice-enabled device 102. For example, data may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 222 may be implemented as computer-readable storage media ("CRSM"), which may be any available physical media accessible by processor(s) 220 to execute one or more instructions stored within storage/memory 222. In some embodiments, one or more applications (e.g., gaming, music, video, calendars, lists, etc.) may be run by processor(s) 220, and may be stored in memory 222.

In some embodiments, storage/memory 222 may store voice biometric data associated with one or more individuals. For example, an individual that operates a voice-enabled device 102 may have a registered user account or other profile data on speech processing system 100 (e.g., within a user data store 216). In some embodiments, a voice-enabled device 102 may be associated with a group account, and various individuals may have user accounts that are operating under the rules and configurations of the group account. As an illustrative example, a voice-enabled device 102 may be associated with a first group account on the speech processing system 100, the first group account being for a family that lives at a household where a voice-enabled device 102 is located. Each family member may also have a user account that is linked to the first group account (e.g., a parent, a child, etc.), and therefore each user account may obtain some or all of the rights of the first group account. For example, a voice-enabled device 102 may have a first group account on speech processing system 100 registered to a particular family or group, and each of the parents and children of the family may have their own user account registered under the parent's registered account. In one illustrative embodiment, voice biometric data for each individual may be stored by that individual's corresponding user account. The voice biometric data, for instance, may correspond to a "voice print" or "voice model" of a particular individual, which may be a graphical representation of a person's voice including a frequency decomposition of that individual's voice.

Communications circuitry 224 may include any circuitry allowing or enabling one or more components of a voice-enabled device 102 to communicate with one another, and/or with one or more additional devices, servers, and/or systems. For example, communications circuitry 224 may facilitate communications between a voice-enabled device 102 and speech processing system 100. As an illustrative example, audio data representing an utterance (e.g., utterance 106 of FIG. 1) may be transmitted over a network 150, such as the Internet, to speech processing system 100 using any number of communications protocols, such as Transfer Control Protocol and Internet Protocol ("TCP/IP") (e.g., any of the protocols used in each of the TCP/IP layers), Hypertext Transfer Protocol ("HTTP"), WebRTC, SIP, wireless application protocol ("WAP"), etc. Communications circuitry 224 may use any communications protocol, such as any of the previously mentioned exemplary communications protocols. In some embodiments, a voice-enabled device 102 may include one or more antennas to facilitate wireless communications with a network using various wireless technologies (e.g., Wi-Fi, Bluetooth, radiofrequency, etc.). In yet another embodiment, a voice-enabled device 102 may include one or more universal serial bus ("USB") ports, one or more Ethernet or broadband ports, and/or any other type of hardwire access port so that communications circuitry 224 allows a voice-enabled device 102 to communicate with one or more communications networks.

A voice-enabled device 102 may also include one or more microphones 226 and/or transducers. In addition, or alternatively, one or more microphones located within a separate device may be in communication with a voice-enabled device 102 to capture sounds for a voice-enabled device 102. Microphone(s) 226 may be any suitable component capable of detecting audio signals. For example, microphone(s) 226 may include one or more sensors for generating electrical signals and circuitry capable of processing the generated electrical signals. In some embodiments, microphone(s) 226 may include multiple microphones capable of detecting various frequency levels. As an illustrative example, a voice-enabled device 102 may include multiple microphones (e.g., four, seven, ten, etc.) placed at various positions about a voice-enabled device 102 to monitor/capture any audio outputted in the environment where a voice-enabled device 102 is located. The various microphones 226 may include some microphones optimized for distant sounds, while some microphones may be optimized for sounds occurring within a close range of a voice-enabled device 102. In some embodiments, microphone(s) 226 may only begin to detect audio signals in response to a manual input to a voice-enabled device 102. For example, a manually activated device may begin to capture audio data using microphone(s) 226 in response to a user input, such as pressing a button, tapping a touch screen, or providing any touch input gesture to a touch input component.

A voice-enabled device 102 may include one or more speakers 228. Furthermore, a voice-enabled device 102 may be in communication with one or more speaker(s) 228. Speaker(s) 228 may correspond to any suitable mechanism for outputting audio signals. For example, speaker(s) 228 may include one or more speaker units, speaker housings, transducers, arrays of speakers, and/or arrays of transducers that may be capable of broadcasting audio signals and or audio content to a surrounding area where a voice-enabled device 102 may be located. In some embodiments, speaker(s) 228 may include headphones or ear buds, which may be wirelessly wired, or hard-wired, to a voice-enabled device 102, that may be capable of broadcasting audio directly to an individual.

In some embodiments, one or more microphones 226 may serve as input devices to receive audio inputs. A voice-enabled device 102, in the previously mentioned embodiment, may then also include one or more speakers 228 to output audible responses. In this manner, a voice-enabled device 102 may function solely through speech or audio, without the use or need for any input mechanisms or displays, however this is merely exemplary.

Display component 232 may correspond to a display device and/or touch screen, which may be any size and/or shape and may be located at any portion of a voice-enabled device 102. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display component 232 may correspond to a projected capacitive touch ("PCT"), screen. In some embodiments, display component 232 may be an optional component for a voice-enabled device 102. For instance, a voice-enabled device 102 may not include display component 232. Such devices, sometimes referred to as "headless" devices, may output audio, or may be in communication with a display device for outputting viewable content.

In some embodiments, content displayed on display component 232 may be formatted such that contextual entities and lists are able to be analyzed by speech processing system 100 for list resolution and/or anaphora resolution. Context related to the displayed content may include entities associated with a voice-enabled device 102 including, but not limited to, foreground entities (e.g., lists of items, detail pages), background entities (e.g., songs, audio books), and notification entities. The contextual data may be structured into context entity slots, list metadata, and any other additional data available. For example, contextual entity slots may correspond to data used for list resolution and/or anaphora resolution. The contextual entity slots may be specified in domain definitions with corresponding values. The list metadata may include list identifiers, item identifiers for items of a list, and absolute positions of the list for a particular item (e.g., a first item of a list, a second item of a list, etc.). Such additional data may include unique identifiers associated with an object, item prices, quantities, and the like.

In some embodiments, a voice-enabled device 102 may include one or more cameras 230, corresponding to any suitable image capturing component or components capable of capturing one or more images and/or videos. Camera(s) 230 may, in some embodiments, be configured to capture photographs, sequences of photographs, rapid shots (e.g., multiple photographs captured sequentially during a relatively small temporal duration), videos, or any other type of image, or any combination thereof. In some embodiments, a voice-enabled device 102 may include multiple cameras 230, such as one or more front-facing cameras and/or one or more rear facing cameras. Furthermore, camera(s) 230 may be configured to recognize far-field imagery (e.g., objects located at a large distance away from a voice-enabled device 102) or near-field imagery (e.g., objected located at a relatively small distance from a voice-enabled device 102). In some embodiments, the camera(s) may be high-definition ("HD") cameras, capable of obtaining images and/or videos at a substantially large resolution (e.g., 720p, 1080p, 1080i, 4K, etc.). In some embodiments, camera(s) 230 may be optional for a voice-enabled device 102. For instance, camera(s) 230 may be external to, and in communication with, a voice-enabled device 102. For example, an external camera may be capable of capturing images and/or video, which may then be provided to a voice-enabled device 102 for viewing and/or processing.

In some embodiments, display component 232 and/or camera(s) 230 may be optional for a voice-enabled device 102. For instance, a voice-enabled device 102 may function using audio inputs, and outputting audio in response or causing one or more actions to occur in response, and therefore display component 232 and/or camera(s) 230 may not be included. Furthermore, in some embodiments, a voice-enabled device 102 may not include display component 232 and/or camera(s) 230, but instead may be in communication with display component 232 and/or camera(s) 230. For example, a voice-enabled device 102 may be connected to a display screen via a Wi-Fi (e.g., 802.11 protocol) connection such that visual content sent to a voice-enabled device 102 may be sent to the display screen, and output thereby.

In some embodiments, contextual data may be obtained by computer vision analysis of an object detected by camera(s) 230. For example, in response to speaking the utterance, "Buy this," a voice-enabled device 102 may cause camera(s) 230 to capture an image. That image may be analyzed to determine what the object is, and the contextual data associated with that objects identify may be determined. For instance, if an individual is holding up a bottle of ketchup, then the computer vision analysis may be able to determine a product name, bar code, and/or any other attribute about the bottle of ketchup from the captured image, and may populate a contextual data structure indicating the determined values (e.g., 'Item Name' slot: "Ketchup").

The voice-enable device 102 may communicate with the speech processing system 100 over one or more networks 150. The one or more networks 150 may include any viable communication technology, such as wired and/or wireless modalities and/or technologies. Networks 150 may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs")—both centralized and/or distributed—and/or any combination, permutation, and/or aggregation thereof.

As shown in FIG. 2, a speech processing system 100 may include various subsystems, components, and/or modules including, but not limited to, an ASR system 202, an NLU system 204, domains system 206, a TTS system 208, an inter-domain routing system 210, an intra-domain routing system 212, a contextual data management system 214, a user data store 216, and a processing data store 218. In some embodiments, speech processing system 100 may also include an orchestrator system (not shown) capable of orchestrating one or more processes to be performed by one or more of ASR system 202, NLU system 204, domains system 206, TTS system 208, inter-domain routing system 210, intra-domain routing system 212, as well as one or more additional components, devices, and/or systems associated therewith. Speech processing system 100 may also include computer readable media, including, but not limited to, flash memory, random access memory ("RAM"), and/or read-only memory ("ROM"). Speech processing system 100 may also include various modules that store software, hardware, logic, instructions, and/or commands for speech processing system 100, such as a speaker identification ("ID") module, or any other module, or any combination thereof.

ASR system 202 may be configured to recognize human speech in detected audio, such as audio captured by a voice-enabled device 102, which may then be transmitted to speech processing system 100. ASR system 202 may include, in one embodiment, one or more processor(s) 252, storage/memory 254, and communications circuitry 256. Processor(s) 252, storage/memory 254, and communications circuitry 256 may, in some embodiments, be substantially similar to processor(s) 220, storage/memory 222, and communications circuitry 224, which are described in greater detail above, and the aforementioned descriptions may apply. Furthermore, in some embodiments, ASR system 202 may include STT system 280. STT system 280 may employ various speech-to-text techniques.

ASR system 202 may transcribe received audio data into text data representing the words of the speech contained in the audio data using STT system 280. The text data may then be used by other components for various purposes, such as executing system commands, inputting data, etc. The different ways a spoken utterance may be transcribed (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual representation of the spoken utterance (hypothesis) is associated with a confidence score. Based on the considered factors and the assigned confidence score, ASR system 202 may output the most likely textual representation(s) of the audio data.

ASR system 202 may generate results data in the form of a single textual representation of the speech, an N-best list including multiple hypotheses and respective scores, and/or lattice, for example, which may be sent to NLU system 204 for processing, such as conversion of the text into commands for execution, either by a voice-enabled device 102, speech processing system 100, or by another device, such as a separate device or server capable of performing one or more additional functionalities thereon (e.g., a television capable of outputting video content).

NLU system 204 may be configured such that it determines an intent of an utterance based on the received audio data. NLU system 204 may include processor(s) 252, storage/memory 254, and communications circuitry 256 which, in one embodiment, may be substantially similar to processor(s) 220, storage/memory 222, and communications circuitry 224 of electronic device 102, and the previous description may apply.

NLU system 204 may include a named entity recognition ("NER") system 272, which may be used to identify portions of text that correspond to a named entity recognizable by NLU system 204. A downstream process called named entity resolution 292 may be configured to link a portion of text to an actual specific known entity. To perform named entity resolution, the system may utilize gazetteer data stored in an entity library storage. The gazetteer data may be used for entity resolution, for example matching ASR results with different entities (such as song titles, contact names, etc.). Gazetteers may be linked to a user account or profile of users accounts data store 216, certain domains (e.g., music or shopping), or may be organized in a variety of other ways.

Generally described, NLU system 204 may take textual input and attempt to make a semantic interpretation of the text. That is, NLU system 204 may be configured to determine a meaning of text data (e.g., based on the individual words represented by the text data) and then implement that meaning. In some embodiments, NLU system 204 may interpret a text string to derive an intent or a desired action of the utterance (e.g., utterance 106) as well as the pertinent pieces of information in the text that allow an action to be completed. For example, if a spoken utterance is processed by ASR system 202 and outputs the text, "call mom," NLU system 204 may determine that an intent of the utterance is to activate a telephone, or telephone functionality, and to initiate a call with a contact matching the entity "mom". In some embodiments, NLU system 204 may process several textual inputs related to the same utterance. For example, if ASR system 202 outputs N text segments (as part of an N-best list), then NLU system 204 may process all N outputs.

NLU system 204 may be configured to parse and label, tag, or otherwise annotate text. For example, in the text "call mom," the word "call" may be tagged as a command (e.g., a command to execute a phone call), and the word "mom" may be tagged as a specific entity and target of the command (e.g., a telephone number for the entity corresponding to "mom" stored in a contact list). Further, NLU system 204 may be used to provide answer data in response to queries, for example using a knowledge base stored within storage/memory 254 of NLU system 204 and/or storage/memory of speech processing system 100.

An intent classification ("IC") system 274 may parse the query to determine an intent or intents, where the intent corresponds to the action to be performed that is responsive to the query. The intents identified by IC system 274 may be linked to grammar frameworks having fields, also referred to as "slots," to be filled. Each slot may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks may not be structured as sentences, but rather based on associating slots with grammatical tags. As another example, if "Play 'Song 1'" is an identified intent, a grammar framework may correspond to sentence structures such as "Play {Song 1}."

NER system 272 may parse the query to identify words as subject, object, verb, preposition, etc., based on grammar rules and/or models, prior to resolving named entities. The identified verb may be used by IC module 274 to identify intent, which is then used by NER system 272 to identify frameworks. A framework for an intent of "play" may specify a list of slots/fields/placeholders applicable to place the identified "object" such as, for example, {Artist Name}, {Album Name}, {Song Name}, {Application Name}, {Anaphoric Term}, and any object modifier (e.g., a prepositional phrase). NER system 272 may then search the corresponding fields in the domain-specific and personalized lexicon(s), attempting to match words and phrases in the query, which are tagged as a grammatical object or object modifier, with those identified in the database(s).

For instance, a query of "Play 'Song 1' by 'Artist 1'" might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, which IC module 274 may determine corresponds to the "play music" intent. No determination has been made as to the meaning of "Song 1" and "Artist 1," but based on a models, such as a multi-modal model, it may be determined that the text of these phrases relate to the grammatical object (i.e., entity) of the query.

The frameworks linked to the intent may then be used to determine what database fields should be searched to determine the meaning of these phrases, such as searching a user's gazette for similarity with the framework slots. So a framework for a "play music" intent might attempt to resolve the identified object for {Artist Name}, {Album Name}, {Song Name}, and {Application Name}, {Anaphoric Term} and another framework for the same intent might attempt to resolve the object modifier based on {Artist Name}, and resolve the object based on {Album Name} and {Song Name} linked to the identified {Artist Name}. If the search of the gazetteer does not resolve a slot/field using gazetteer data, NER system 272 may search the database of generic words associated with the particular domain. So for instance, if the query was "play songs by 'Artist 1,'" after failing to determine an album name or song name called "songs" by "Artist 1," NER system 272 may search the domain vocabulary for the word "songs." For example, use of the object "songs" may correspond to some or all of the songs associated with a particular artist (e.g., "Artist 1"). In the alternative, generic words may be checked before the gazetteer data, or both may be tried, potentially producing two different results.

The results of the natural language understanding processing may be tagged or labeled to attribute meaning to the query. So, for instance, "Play 'Song 1' by 'Artist 1'" might produce a result of: {Intent}: "play-music," {Artist Name}: "Artist 1," {Media Type}: "Song," and {Song Name}: "Song 1." As another example, "Play songs by 'Artist 1'" might produce: {Intent}: "play-music," {Artist Name}: "Artist 1," and {Media Type}: Song. Still further, "Add this to my cart'" might produce a result of: {Intent} "add-item-to," {Anaphoric Term}: "this," and {List Type} "cart."

The NLU system 204 may generate multiple intent hypotheses to be considered by downstream processes. In some embodiments, the set of intent hypotheses may be arranged in an N-best list of intents and slots corresponding to the top choices as to the meaning of an utterance, along with scores for each item. For example, for ASR output data representing the utterance "Play Harry Potter," the NLU system 204 may generate output in the form of an N-best list s of scored intent hypotheses, such as:
- (0.93) Intent: play-movie; Title: "Harry Potter and the Sorcerer's Stone"
- (0.03) Intent: play-movie; Title: "Harry Potter and the Deathly Hallows Part 2"
- (0.02) Intent: play-movie; Title: "Harry Potter and the Deathly Hallows Part 1"
- (0.01) Intent: play-music; Title: "Harry Potter Original Motion Picture Soundtrack"
- (0.01) Intent: play-audio-book; Title: "Harry Potter and the Sorcerer's Stone"

The NLU system 204 can generate scores for intents and content slots using the text data and other data, such as contextual data. The scores may indicate how likely individual labels are to be the correct labels for individual words of the utterance being processed. In the present example, the utterance "Play Harry Potter" includes three words: "Play," "Harry," and "Potter." The individual words may be labeled using a predetermined set of labels, including different labels for the various intents recognizable by the NLU system 204 and different labels for the content slots that correspond to the various intents.

This process may include semantic tagging, which is the labeling of a word or a combination of words according to their type/semantic meaning. Labeling may be performed using an NER model, alone or in combination with heuristic grammar rules. The NER model may be constructed using techniques such as hidden Markov models, maximum entropy models, log linear models, conditional random fields ("CRF"), or other models configured to generate labeling data (e.g., scores, probabilities, etc. for individual labels) using text data and, in some cases, contextual data.

In some embodiments, the NLU system 204 may include domain-specific recognizers for each of multiple domains, and each of the domain-specific recognizers may include their own NER component 272, IC component 274, etc. For example, the NLU system 204 may include recognizers for a shopping domain, a music domain, a video domain, and a communications domain.

The NLU system 204 may also include a slot filler component 290. The slot filler component 290 can take text from slots and alter it to make the text more easily processed by downstream components. The operations of the slot filler component 290 are typically low latency operations that do not involve heavy operations such as reference to a knowledge base. The purpose of the slot filler component 290 is to replace words with other words or values that may be more easily understood by downstream components. For example, if a textual interpretation represented in the text data 320 included the word "tomorrow," the slot filler component 290 may replace the word "tomorrow" with an actual date for purposes of downstream processing. Similarly, a word "CD" may be replaced by a word "album" of the words "compact disc." The replaced words may then be included in the cross-domain N-best list data.

N-best list data may then be sent to an entity resolution component 292. The entity resolution component 292 can apply rules or other instructions to standardize labels or tokens from previous stages into an intent/slot representation. The precise transformation may depend on the domain (e.g., for a travel domain a text mention of "Boston airport" may be transformed to the standard BOS three-letter code referring to the airport). The entity resolution component 292 can refer to an authority source (such as a knowledge base) that is used to specifically identify the precise entity referred to in the entity mention identified in each slot represented in the cross-domain N-best list data. Specific intent/slot combinations may also be tied to a particular source, which may then be used to resolve the text. In the example "play songs by the stones," the entity resolution component 292 may reference a personal music catalog, Amazon Music account, user account, or the like. The output from the entity resolution component 292 may include altered N-best list data that is based on the cross-domain N-best list represented in the cross-domain N-best list data, but may also include more detailed data (e.g., entity IDs) about the specific entities mentioned in the slots and/or more detailed slot data that can eventually be used by an application 282 which may be incorporated into the same system components or pipeline or may be on a separate device in communication with the NLU system 204. Multiple entity resolution components 292 may exist where a particular entity resolution component 292 may be specific to one or more domains.

The NLU system 204 may produce NLU output data from the N-best list data described above. The NLU output data may include a highest-scoring interpretation from the cross-domain N-best list data, or it may be data representing an N-best list of highest-scoring interpretations. In some embodiments, the NLU system 204 may re-score, bias, or otherwise alter the N-best list data generated by the entity resolution component 292. To do so, the NLU system 204 may consider not only the N-best list data generated by the entity resolution component 292, but may also consider other data. The other data may include a variety of data. For example, the other data may include application rating or popularity data. For example, if one application has a particularly high rating, the NLU system 204 may increase the score of results associated with that particular application. The other data may also include data about applications that have been specifically enabled by the user (as indicated in a user account). NLU output data associated with enabled applications may be scored higher than results associated with non-enabled applications.

An example of processing of an NLU system is described in U.S. Pat. No. 10,515,625, issued on Dec. 24, 2019, which is incorporated by reference herein.

Domains system 206 may, for example, correspond to various action specific applications 282, which are capable of processing various task specific actions and/or performing various functionalities related to the user experience. Domains system 206 may further correspond to first party applications and/or third party applications capable of performing various tasks or actions, or performing various functionalities. For example, based on the context of the audio received from a voice-enabled device 102, speech processing system 100 may use a certain application 282 to generate a response, or to obtain response data, which in turn may be communicated back to a voice-enabled device 102 and/or to another electronic device (e.g., a television). Domains system 206 may also include processor(s) 252, storage/memory 254, and communications circuitry 256. In some embodiments, an application 282 of domains system 206 may be written in various computer languages, such as JavaScript and Java.

TTS system 208 may employ various text-to-speech techniques for presentation to a user (e.g., a spoken response to an utterance). TTS system 208 may also include processor(s) 252, storage/memory 254, communications circuitry 256, and speech synthesizer 284.

Inter-domain routing system 210 may manage routing of utterances to the appropriate domain, as described in greater detail below. Inter-domain routing system 210 may also include processor(s) 252, storage/memory 254, communications circuitry 256, and speech synthesizer 284.

Intra-domain routing system 212 may manage routing of utterances, within a particular domain, to the appropriate subdomain and/or application 282, as described in greater detail below. Intra-domain routing system 212 may also include processor(s) 252, storage/memory 254, communications circuitry 256, and speech synthesizer 284.

Contextual data management system 214 may manage acquisition of contextual data to be used in routing determinations as described in greater detail below. Contextual data management system 214 may also include processor(s) 252, storage/memory 254, communications circuitry 256, and speech synthesizer 284.

User data store 216 may store data representing or otherwise associated with one or more user accounts or user profiles, corresponding to users having an account on speech processing system 100. In some embodiments, data, settings, and/or preferences for each user profile may be stored by user data store 216. For example, the user data store 216 may store data regarding prior user interactions with the speech processing system 100, such as data regarding actions that the speech processing system 100 has performed in response to utterances from a user associated with a particular user profile. As another example, the user data store 216 may store data regarding one or more voice-enabled devices 102 associated with a user profile, such as device identifiers, phone numbers, network addresses, version information, data regarding capabilities and installed applications, and the like. In some embodiments, user data store 216 may include a list of media items currently stored within an individual's registered account or user profile. For example, a list of music or videos purchased or obtained by an individual may be stored within the individual's user profile on user data store 216, which may be accessed by the individual when the individual seeks to hear a particular song or songs, or view a particular video or videos. User data store 216 may also include a listing of all applications currently enabled for each user profile. In some embodiments, NLU system 204 may receive indications of which applications are currently enabled for a particular user profile or account, such that NLU system 204 is aware of which rules and capabilities that speech processing system 100 is able to perform for the particular user profile or account. In some embodiments, user data store 216 may store a voice signal, such as voice biometric data, for a specific user profile. This may allow speaker identification techniques to be used to match a voice to voice biometric data associated with a specific user profile. The examples of data stored in the user data store 216 are illustrative only, and are not exhaustive, required, or limiting of the data that may be stored in the user data store 216.

Processing data store 218 may store data to be used during the processing of an utterance, such as contextual data obtained and/or generated by the contextual data management system 214, as described above and in greater detail below. Such data may be used during routing determinations, for example those made by the intra-domain routing system 212. In some embodiments, processing data store 218 may store data to be used offline, such as after (or without) processing an utterance. For example, data regarding the utterance, contextual data items obtained during processing of the utterance, feedback, etc. may be stored in the processing data store 218 and used during offline processes such as training a model used by one or more components of the speech processing system 100.

Although each of ASR system 202, NLU system 204, domain systems 206, TTS system 208, inter-domain routing system 210, intra-domain routing systems 212, contextual data management system 214, user data store 216, and processing data store 218 may each include instances of processor(s) 252, storage/memory 254, and communications circuitry 256, and those instances of processor(s) 252, storage/memory 254, and communications circuitry 256 within each of ASR system 202, NLU system 204, domain systems 206, TTS system 208, inter-domain routing system 210, intra-domain routing systems 212, contextual data management system 214, user data store 216, and processing data store 218 may differ. For example, the structure, functionality, and style of processor(s) 252 within ASR system 202 may be substantially similar to the structure, functionality, and style of processor(s) 252 within NLU system 204, however the actual processor(s) 252 need not be the same entity.

Domain Routing

Figure 3:
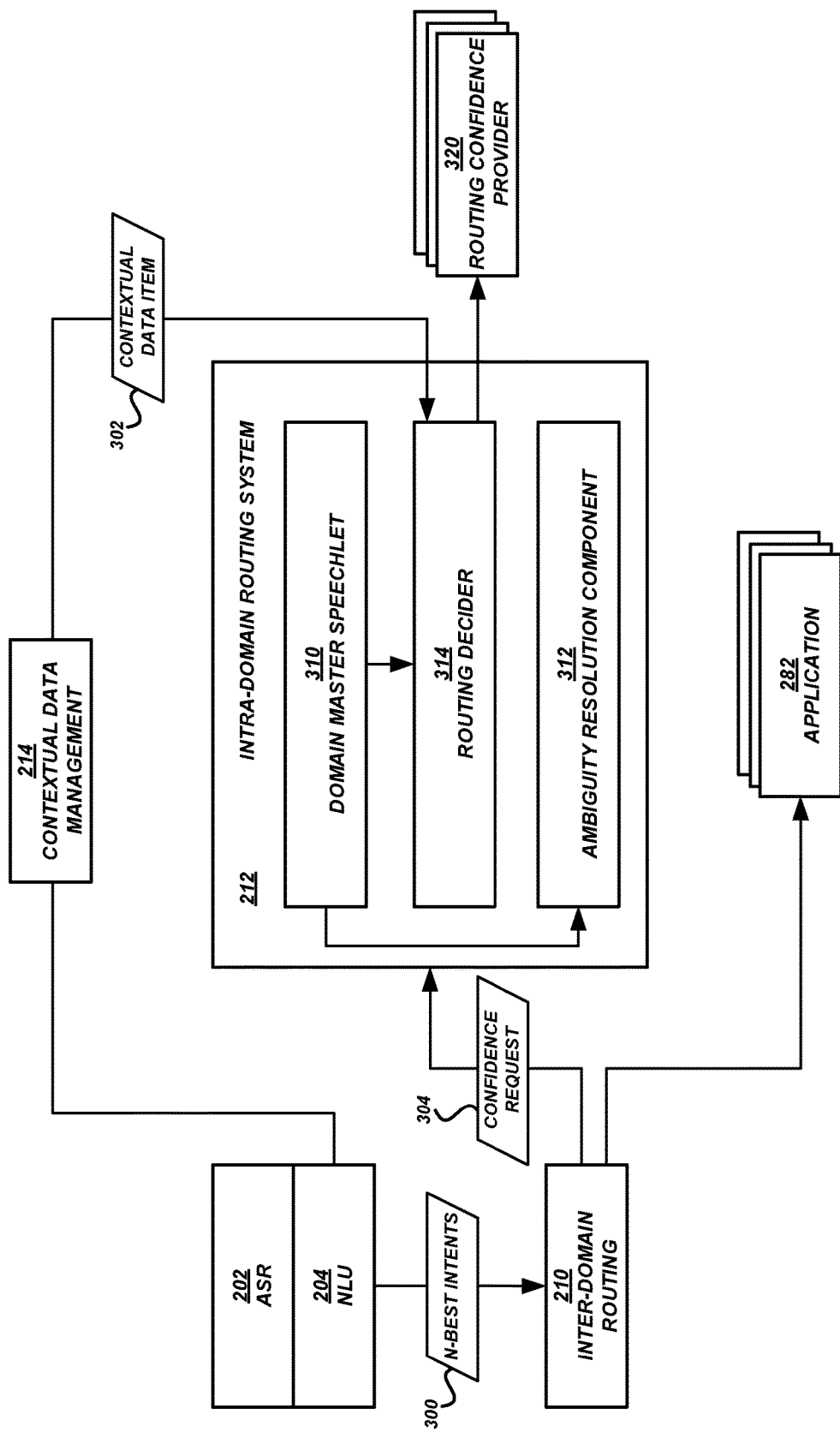
FIG. 3 is a diagram of illustrative data flows and interactions between components of an intra-domain routing system and other components of a speech processing system according to some embodiments.

FIG. 3 is a diagram of illustrative data flows and interactions between components of the speech processing system 100 during the processing and routing of an utterance to an application for response or other action. Portions of FIG. 3 will be described with further reference to FIG. 4, which is a flow diagram of an illustrative process that may be executed by an intra-domain routing system 212 to generate routing confidence evaluations for the utterance.

As shown, an utterance may be processed using a set of natural language processing actions, such as those performed by the ASR system 202 and NLU system 204, to generate one or more intents, such as an N-best list 300. Before, during, and after the course of generating the intent(s), various contextual data items 302 may be obtained and/or generated by the contextual data management system 214. An example process for obtaining and/or generating contextual data items for use by one or more intra-domain routing systems 212 is described in greater detail below.

The inter-domain routing system 210 can determine which domains are associated with individual intents of the N-best list 300. In some embodiments, individual domain systems 206 may be assigned, registered, or otherwise associated with different intents. The inter-domain routing system 210 may determine which domain systems 206 are associated with each of the intents in the N-best list 300 (or a subset thereof). The inter-domain routing system 210 may generate and send confidence requests 304 to the intra-domain routing systems 212 for the determined domain systems 206. For example, the N-best list 300 may include five intents, ranked 1-5, where 1 is the highest-ranked intent and 5 is the fifth-highest ranked intent. A particular domain system 206 may be registered to handle two of the five intents (e.g., the intents ranked 1 and 4), another domain system may be registered to handle one of the intents (e.g., the intent ranked 2), and so on. The inter-domain routing system 210 can generate a confidence request 304 to the intra-domain routing system 212 for the domain 206 registered to handle the intents ranked 1 and 4. The confidence request 304 may be a request for the intra-domain routing system 212 to evaluate whether the corresponding domain 206, or a specific application 282 thereof, is the proper entity to respond to the user utterance. A confidence request may include the intents, and in some cases may include additional information, such as ranking information or the like.

Upon receipt of a confidence request 304, the intra-domain routing system 212 can identify one or more routing confidence providers 320 to generate routing confidence evaluations that will be used to assign a specific application 282 to generate a response to the utterance, or to determine that no application of the domain is to generate a response. Although the routing confidence providers 320 are shown in FIG. 3 as being external to the intra-domain routing system 212, in some embodiments, any or all of the routing confidence providers 320 may be integrated into the intra-domain routing system 212. For example, the intra-domain routing system 212 may include routing confidence providers for each application of the corresponding domain, or for a subset thereof. As another example, one or more routing confidence providers may be hosted by a computing system outside of the intra-domain routing system 212, such as a computing system on which a corresponding application is implemented. Illustratively, the domain may be configured with an application programming interface ("API") that allows third-party entities to provide applications and corresponding routing confidence providers for a particular domain.

Figure 4:
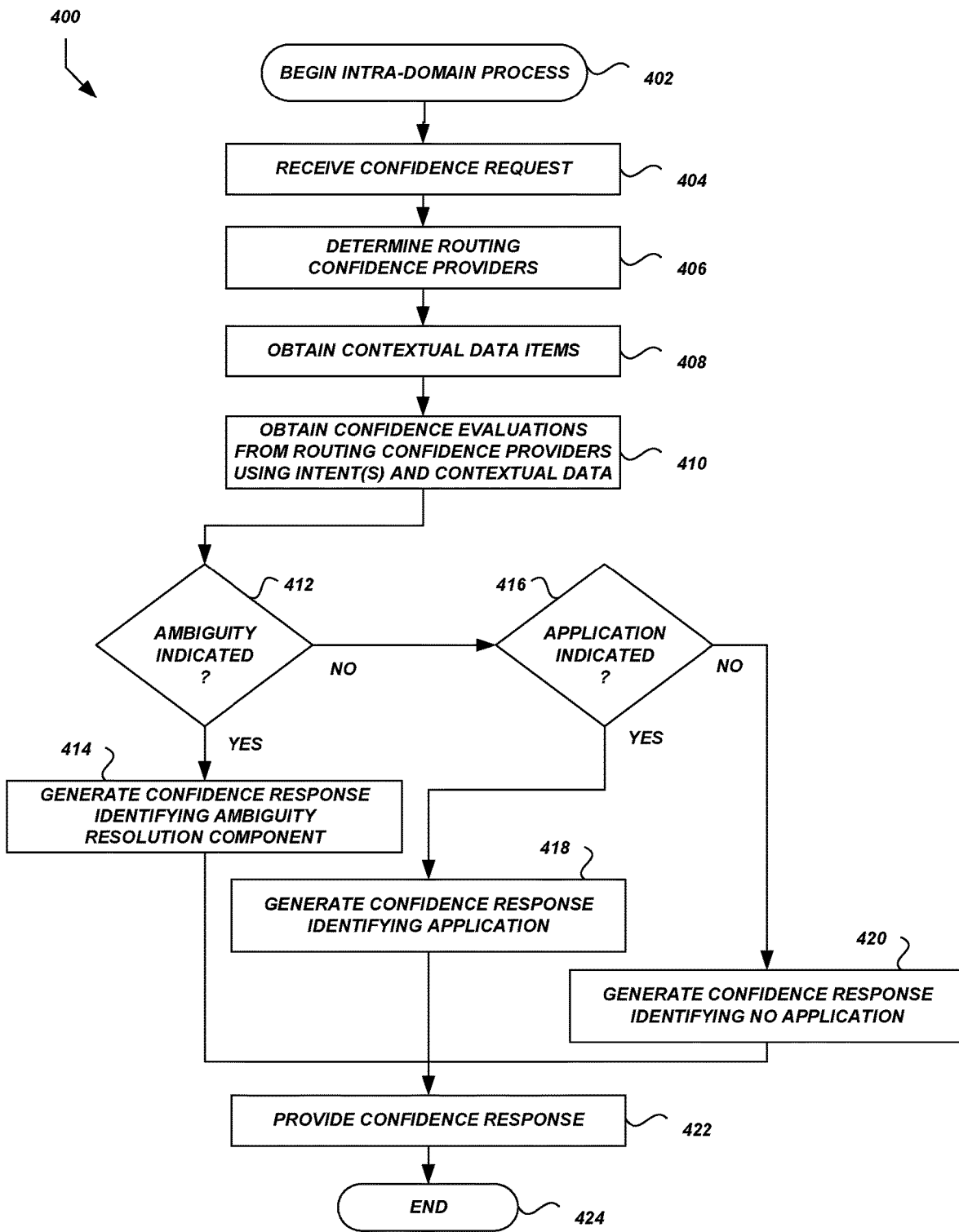
FIG. 4 is a flow diagram of an illustrative process for intra-domain routing using contextual data according to some embodiments.

FIG. 4 is a flow diagram of an illustrative process 400 that may be performed by an intra-domain routing system 212 to generate routing confidence evaluations in response to confidence requests 304. The process 400 begins at block 402. When the process 400 is initiated, a set of executable program instructions stored on one or more non-transitory computer-readable media (e.g., hard drive, flash memory, removable media, etc.) may be loaded into memory (e.g., random access memory or "RAM") of a computing device and executed. For example, executable instructions may be loaded into memory 254 of a computing device of the intra-domain routing system 212 and executed by one or more processors 252. In some embodiments, the process 400 or portions thereof may be implemented on multiple processors, serially or in parallel.

At block 404, the intra-domain routing system 212 may obtain the confidence request 304 from the inter-domain routing system 210. In some embodiments, the confidence request may be obtained by, or provided to, a particular component of the intra-domain routing system 212, such as a master speechlet 310 for the corresponding domain 206.

At block 406, the master speechlet 310 may use another component of the intra-domain routing system 212, such as routing decider 314, to determine the routing confidence providers 320 from which to obtain routing confidence evaluations. For example, a particular domain system 206 may be associated with any number of subdomains and/or applications 282. A routing confidence provider 320 may be implemented for each individual subdomain or application 282, or various subsets thereof. Individual routing confidence providers 320 may be configured to generate routing confidence evaluations (e.g., scores) indicating degrees of confidence that a particular subdomain or application 282 is the appropriate entity to respond to an utterance. The routing decider 314 or some other component of the intra-domain routing system 212 may identify the routing confidence providers 320 from which to obtain routing confidence evaluations based on a predetermined or dynamically-determined mapping of intents 300 to routing confidence providers 320. For each intent 300 in the confidence request 304, the routing decider 314 may identify the routing confidence provider(s) 320 from which to obtain a routing confidence evaluation.

At block 408, the routing decider 314 or some other component of the intra-domain routing system 212 may obtain the contextual data items 302, if any, to be provided to the routing confidence providers 320. In some embodiments, a mapping may be used to determine the specific contextual data items that a given routing confidence provider 320 is to be provided with. For example, one routing confidence provider 320 may make a routing confidence evaluation using location data associated with the voice-enabled device 102 and capability data representing capabilities of the voice-enabled device, while another routing confidence provider 320 may make a routing confidence evaluation based on particular entities recognized in the utterance and particular content items displayed by the voice-enabled device 102 when the utterance was made. The routing decider 314 may obtain the contextual data items mapped to each of the routing confidence providers 320. In some embodiments, the contextual data items may be obtained from the processing data store 218, from the contextual data management system 214, and/or from other sources.

At block 410, the routing decider 314 can obtain routing confidence evaluations from the identified routing confidence providers 320. The routing decider 314 may generate requests, commands, or other communications to the routing confidence providers 320, and may include contextual data items 302 in the same communication or may provide access to the contextual data items 302 is some other manner (e.g., by providing a memory or network address of the location from which the routing confidence providers 320 can obtain the contextual data items 302). In some embodiments, the routing confidence providers 320 can obtain the contextual data items 302 directly from the processing data store 218, contextual data management system 214, or other source without receiving or otherwise being provided access to the contextual data items 302 from the routing decider 314. Individual routing confidence providers 320 may make routing confidence evaluations in a variety of ways.

In some embodiments, a routing confidence provider 320 may apply a set of one or more deterministic rules. For example, a set of rules may include applying a particular score or factor if the intent being evaluated is one intent, and a different score or factor if the intent is a different intent. As another example, a score or factor may be used depending upon the ranking of the intent within the N-best list (e.g., if the ranking is relatively low, then the confidence evaluation may be lower than if the ranking was relatively high). The same, additional, and/or alternative scores and/or factors may be incorporated depending upon the values of any contextual data items 302 being considered (e.g., geolocation of the voice-enabled device 102, geographic distance of the voice-enabled device 102 from a point of interest, content displayed by the voice-enabled device 102 when the utterance was made, individual words or phrases present in the utterance, historical usage by an active user profile, content catalog associated with the active user profile, etc.). The routing confidence provider 320 may apply the various scores, factors, calculations, and the like based on the set of deterministic rules, and arrive at an output routing confidence evaluation. The routing confidence evaluation may be a score, such as a score between a minimum (representing a minimum degree of confidence that the utterance is properly handled by an application associated with the routing confidence provider 320) and a maximum (representing a maximum degree of confidence). In some embodiments, the routing confidence evaluation may involve generating a classification into one or more possible classes, such as a first class indicating a low degree of confidence, a second class indicating a high degree of confidence, and a third class indicating a moderate degree of confidence associated with ambiguity.

In some embodiments, a routing confidence provider 320 may apply a statistical model or some other non-deterministic calculation. For example, a statistical model may be derived from a set of observed and/or synthetic data. Application of the statistical model may include obtaining or deriving input values representing the intent being evaluated, the ranking of the intent within the N-best list, the values of any contextual data items 302 being considered, etc. The routing confidence provider 320 may apply the various scores, factors, calculations, and the like based on the statistical model and arrive at an output routing confidence evaluation. The routing confidence evaluation may be a score, such as a score between a minimum and a maximum, a classification into one or more possible classes, etc.

In some embodiments, a routing confidence provider 320 may use a combination of deterministic rules and a statistical model to arrive at a routing confidence evaluation. In some embodiments, additional and/or alternative routing confidence evaluation methods may be used. The example routing confidence evaluation methods described herein are illustrative only, and are not intended to be limiting, required, or exhaustive.

At decision block 412, the routing decider 314 or some other component of the intra-domain routing system 212 may determine whether the routing confidence evaluation(s) received from the routing confidence provider(s) 320 indicate ambiguity. If so, the process 400 may proceed to block 414 where a response to the confidence request indicating ambiguity may be generated. Otherwise, if the routing confidence evaluations do not indicate ambiguity, the process 400 may proceed to decision block 416.

In some embodiments, identification of ambiguity may be based on whether any confidence evaluation made by a routing confidence provider 320 indicates ambiguity. For example, if the routing evaluation is a score between two extremes indicating lowest and highest confidence, respectively, then a score that is at least a threshold distance from both extremes (e.g., in the middle 50% of the range, in the middle 33% of the range, etc.) may trigger identification of an ambiguity. As another example, if the confidence evaluation is one of three classes indicating low, high, and moderate confidence, respectively, then an evaluation in the moderate class may trigger identification of an ambiguity. In some embodiments, identification of ambiguity may be based on whether a highest confidence evaluation, of all confidence evaluations requested by the routing decider 314, indicates ambiguity.

At block 414, the routing decider 314 or some other component of the intra-domain routing system 212 may generate a response to the confidence request based on the identification of the ambiguity. In some embodiments, the response to the confidence request may indicate that an ambiguity resolution component 312 of the intra-domain routing system 212 is the proper entity to respond to the utterance. The ambiguity resolution component 312 may be configured to resolve routing ambiguities that remain after (or were introduced during) ASR, NLU, and other processes. The ambiguity resolution component 312 may resolve ambiguity in interpreting the utterance and determine a destination entity (subdomain or application) to respond. For example, the ambiguity resolution component 312 may perform non-interactive engagement with the user in resolving the ambiguity by providing a relevant hint/suggestion and enabling the user to re-phrase. The re-phrased utterance may then be handled using the utterance processing described above (e.g., handled as though the prior utterance did not occur) without being directed back to the ambiguity resolution component 312. As another example, the ambiguity resolution component 312 may conduct an interactive engagement with the user (e.g., a multi-turn dialog) to resolve the ambiguity through clarifications and/or confirmations. In this case, the user's responses may be directed back to the ambiguity resolution component 312 as part of the multi-turn dialog management by the ambiguity resolution component 312. Illustratively, the interactive engagement may involve presenting options to the user, such as two or more possible applications (e.g., corresponding to the two or more highest routing confidence evaluations) and asking the user to choose one. As a further example, the ambiguity resolution component 312 may obtain additional contextual data items 302 that may not have been available during the initial routing confidence evaluation process, and may use those additional contextual data items 302 to resolve the ambiguity without the need for additional user input (e.g., by adjusting or overriding one or more routing confidence evaluations).

At decision block 416, the routing decider or some other component of the intra-domain routing system 212 may determine whether or not the routing confidence evaluations are indicative of a subdomain or application, of the domain 206 for which the intra-domain routing system 212 is generating routing confidence evaluations, being the proper entity for responding the utterance. If so, the process 400 may proceed to block 418 where the routing decider 314 or some other component of the intra-domain routing system 212 may generate a response to the confidence request indicating the subdomain or application of the domain 206 for which there is a high degree of confidence in being the proper entity for responding to the utterance. Otherwise, the process 400 may proceed to block 420 where the routing decider 314 or some other component of the intra-domain routing system 212 may generate a response to the confidence request indicating that no subdomain or application of the domain 206 is the proper entity for responding to the utterance.

At block 422, the intra-domain routing system 212 may provide the output generated above to the inter-domain routing system 210 in response to the confidence request. The process 400 may terminate at block 424.

Figure 5:
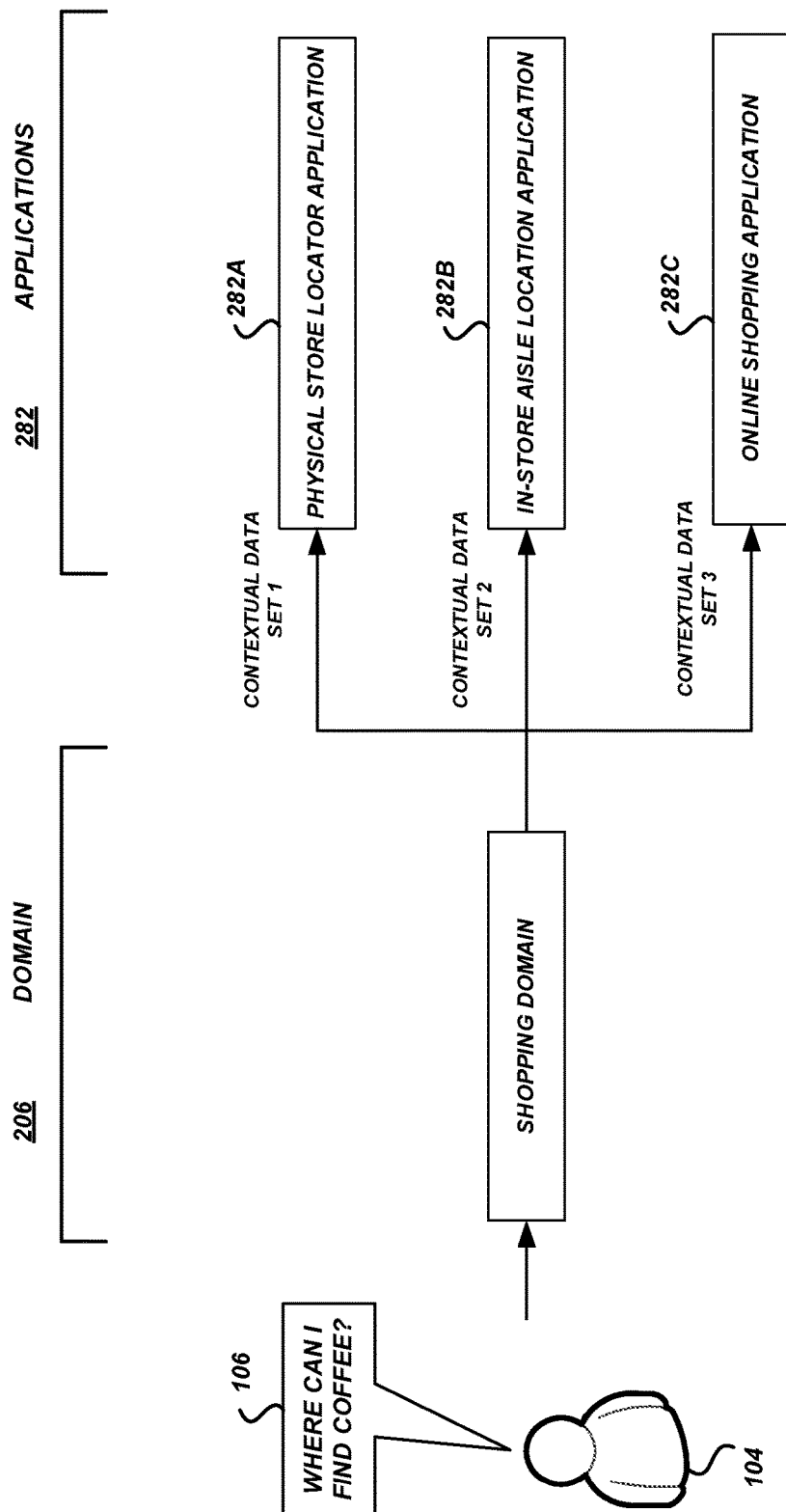
FIG. 5 is a diagram of an illustrative multi-tier domain configuration according to some embodiments.

FIG. 5 is a diagram of a multi-tier domain 206 that includes multiple applications 282. The process 400 may determine that each of the applications 282A, 282B, 282C is the most appropriate application to respond to the utterance, depending upon the contextual data that is obtained and used to make routing confidence evaluations. Illustratively, the utterance 106 is the same utterance from the example in FIG. 1: "Where can I find coffee?" The three example applications are a physical store locator application 282A, an in-store aisle location application 282B, and an online shopping application 282C. If the utterance 106 is made and processed in connection with a first set of contextual data (e.g., location information indicating the utterance was made outside the user's 104 home and outside any store), then the physical store location application 282A may be the most appropriate application to respond to the utterance 106. If the utterance 106 is made and processed in connection with a second set of contextual data (e.g., location information indicating the utterance 106 was made in a store), then the in-store aisle location application 282B may be the most appropriate application to respond to the utterance 106. If the utterance 106 is made and processed in connection with a third set of contextual data (e.g., content presentation information indicating the user is browsing items for purchase online), then the online shopping application 282B may be the most appropriate application to respond to the utterance 106.

Early Invocation and Contextual Data Generation

Figure 6:
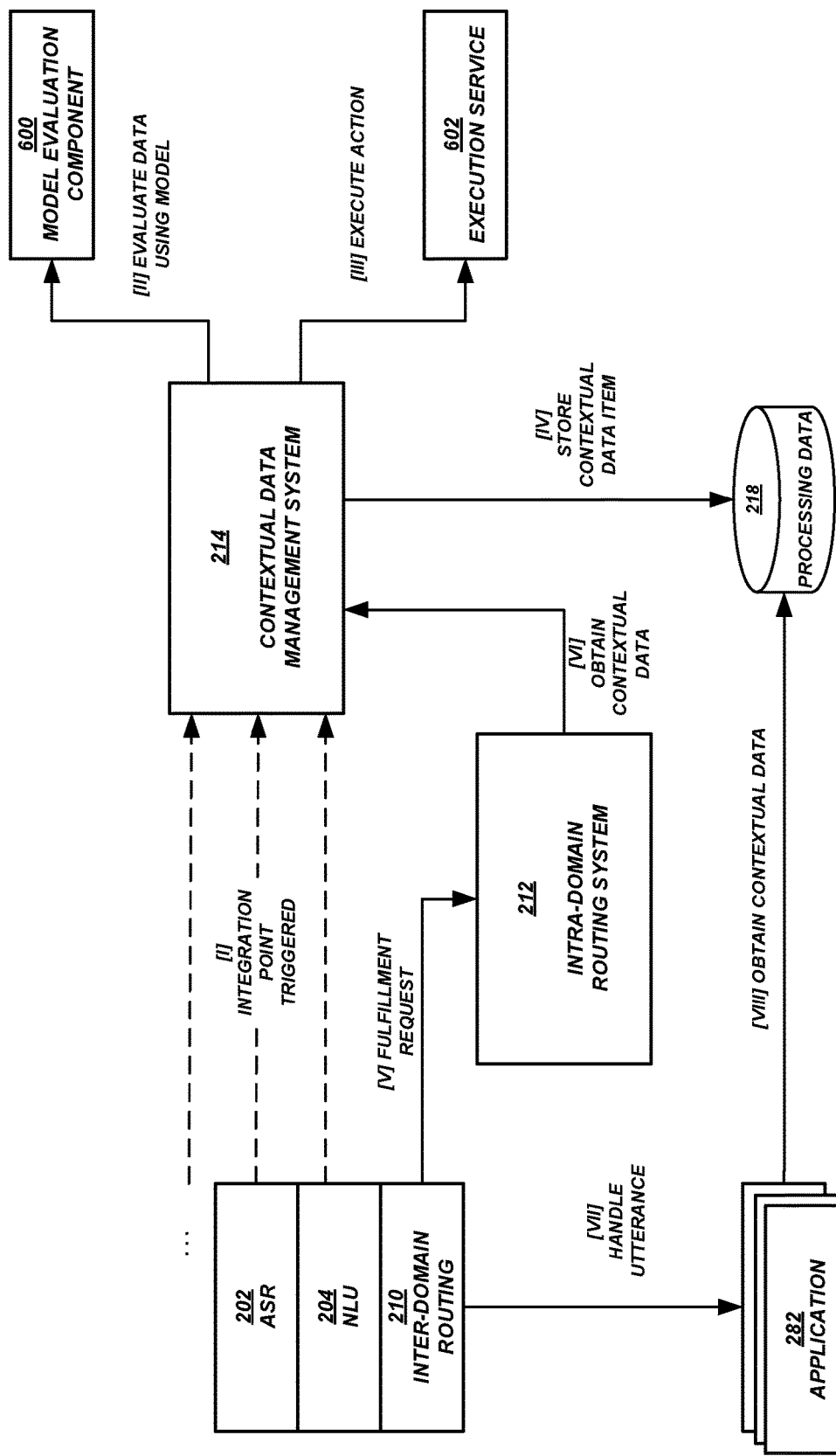
FIG. 6 is a diagram of illustrative data flows and interactions between a contextual data management system and other components of a speech processing system according to some embodiments.

FIG. 6 is a diagram of illustrative data flows and interactions between components of the speech processing system 100 for early invocation of contextual data generation actions during processing of an utterance. Portions of FIG. 6 will be described with further reference to FIG. 7, which is a flow diagram of an illustrative process that may be executed by the contextual data management stem 214 to generate contextual data associated with an utterance, and FIG. 8, which is a diagram of illustrative data flows and interactions between components of a contextual data management system 214 during early invocation of contextual data generation actions.

As shown in FIG. 6 and described in greater detail above, an utterance may be processed using a set of natural language processing actions, such as those performed by the ASR system 202 and NLU system 204, to generate one or more intents. The inter-domain routing system 210 may generate one or more confidence requests 304 based on the intents.

In some cases, the natural language processing actions performed by the ASR system 202 and NLU system 204 may cause or experience a relatively high degree of latency. To reduce or eliminate additional user-perceived latency that may be caused by obtaining and/or generating contextual data items 302 for use in routing confidence evaluations, the contextual data items 302 may be obtained and/or generated proactively, without necessarily waiting for the natural language processing actions to be completed. For example, before, during, and after the course of generating the intent (s), various contextual data items 302 may be obtained and/or generated by the contextual data management system 214. The points at which the contextual data management system 214 receives and/or generates contextual data items may be referred to as integration points.

FIG. 6 shows an integration point triggered at [I] which causes the contextual data management system 214 perform various data aggregation and/or early invocation of processing. When an integration point is triggered, it may cause execution of the contextual data management system 214 to process or store data, or to otherwise initiate early invocation of other processes. Advantageously, execution of the contextual data management system 214 triggered at the integration point may proceed in parallel or otherwise asynchronously with at least a portion of the set of natural language processing actions being performed on the utterance.

In some embodiments, an integration point may be implemented before invocation of the ASR system 202. For example, an identifier of the voice-enabled device 102, an identifier of an active user profile associated with the utterance, an identifier of a geographic location of the voice-enabled device 102, and/or various other data items may be obtained with or are otherwise associated with the utterance. The speech processing system 100 may trigger the integration point based on obtaining such data.

In some embodiments, an integration point may be implemented during execution of the NLU system 204. For example, the NLU system may generate one or more preliminary semantic representations of the utterance being processed, including intents with a subset of slots filled with entities. The NLU system 204 may initiate an entity resolution process to resolve one or more the entities (e.g., to determine whether the candidate entities are present in one or more catalogs or other data stores). An integration point may be implemented at the entity resolution stage, and one or more preliminary semantic representation of the utterance may be provided to the contextual data management system 214 for further processing, storage, or the like.

The example integration points described herein are illustrative only, and are not intended to be limiting, required, or exhaustive. In some embodiments, integration points may be implemented at other portions of utterance processing, such as at any point where data is generated or obtained (e.g., to be processed further or provided to another downstream process). Illustratively, any time data is generated or obtained during or otherwise in connection with utterance processing, the contextual data management system 214 may execute to store the data, obtain new data using the data, process the data to generate new data, or cause early invocation of another process. By invoking data aggregation functions and other functions at an early point and performing them in parallel with other processing of the utterance, any prerequisite operations for subsequent processes may be completed by the time the subsequent processes are initiated (e.g., the process of determining routing responsibility for responding to the utterance), thereby reducing user perceived latency (e.g., delay in receiving a response to the utterance).

For example, at [II] the contextual data management system 214 may employ a model evaluation component 600 to use a model, such as a machine learning model or other probabilistic model, to evaluate one or more currently-available data items and make a prediction, classification, or the like. As another example, at [III] the contextual data management system 214 may use an execution service 602 to precompute a contextual data item. The perfected, precomputed, or otherwise pre-generated contextual data items may be stored at [IV] in a processing data store 218 for access by subsequent processes, or in an internal data store of the contextual data management system 214 to be requested during subsequent processes.

Figure 7:
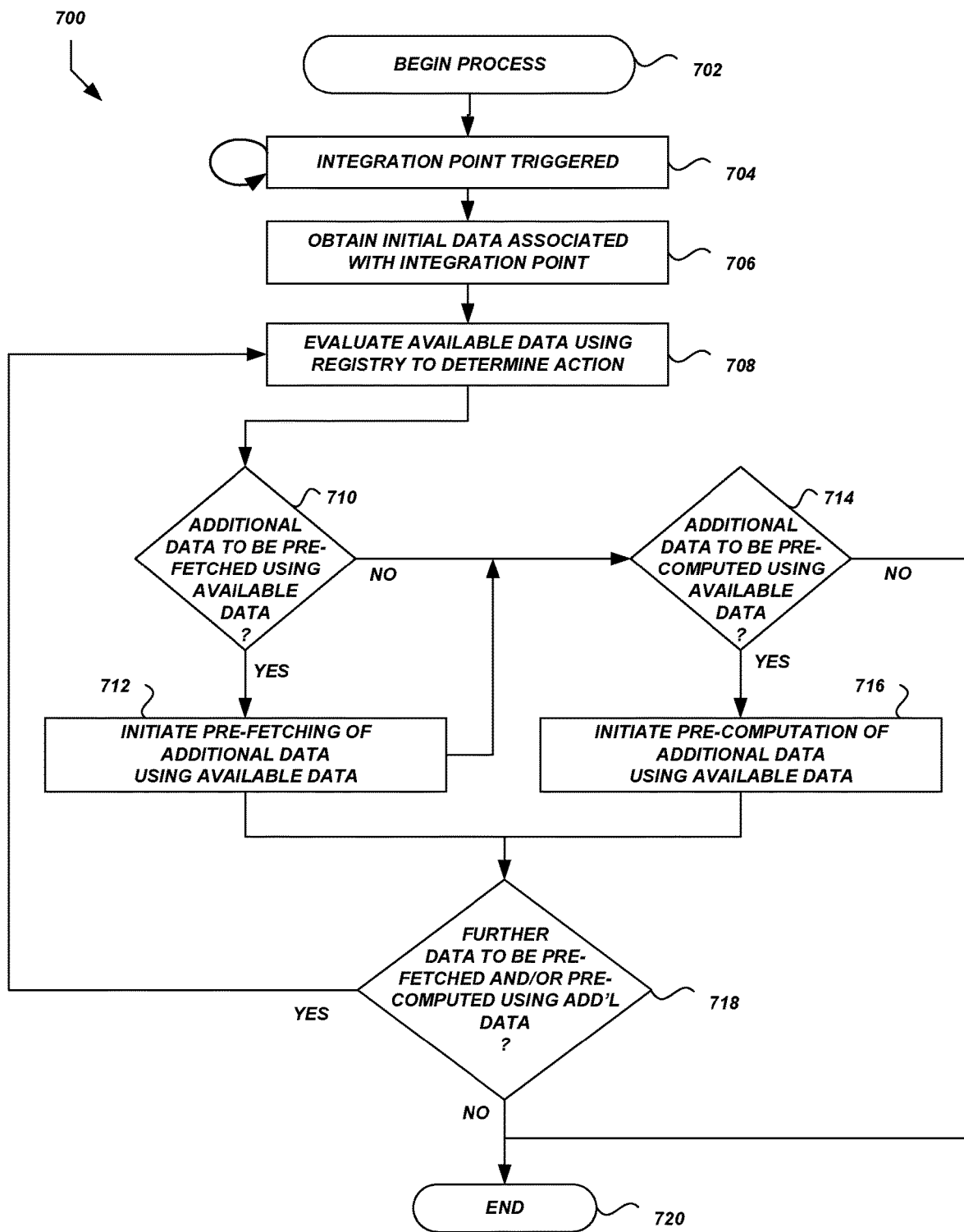
FIG. 7 is a flow diagram of an illustrative process for managing contextual data according to some embodiments.

FIG. 7 is a flow diagram of an illustrative process 700 that may be performed by the contextual data management system 214 for data aggregation and/or early invocation of processing. The process 700 begins at block 702. When the process 700 is initiated, a set of executable program instructions stored on one or more non-transitory computer-readable media (e.g., hard drive, flash memory, removable media, etc.) may be loaded into memory (e.g., random access memory or "RAM") of a computing device and executed. For example, executable instructions may be loaded into memory 254 of a computing device of the contextual data management system 214 and executed by one or more processors 252. In some embodiments, the process 700 or portions thereof may be implemented on multiple processors, serially or in parallel.

At block 704, an integration point may be triggered. Triggering of the integration point may cause execution of the contextual data management system 214. Execution of the contextual data management system 214 may be triggered any number of times at any number of integration points during utterance processing, as indicated by the recurrence arrow. The processing executed by the contextual data management system 214 in response to integration points being triggered may occur serially, in parallel, or asynchronously as needed. In addition, the processing for some integration points may operate independently of the processing for other integration points.

At block 706, the contextual data management system 214 may obtain initial data associated with the integration point. Initial data may include data generated or obtained during utterance processing prior to or upon reaching the integration point. For example, if the integration point that was triggered to initiate the current iteration of the process 700 (the "current integration point") is at utterance intake or otherwise prior to ASR processing, the initial data may include an identifier of the voice-enabled device 102, an identifier of an active user profile, etc. As another example, if the current integration point is at the point of entity resolution during NLU processing, the initial data may include preliminary NLU results such as semantic representations of intent and at least a subset of corresponding entities.

Figure 8:
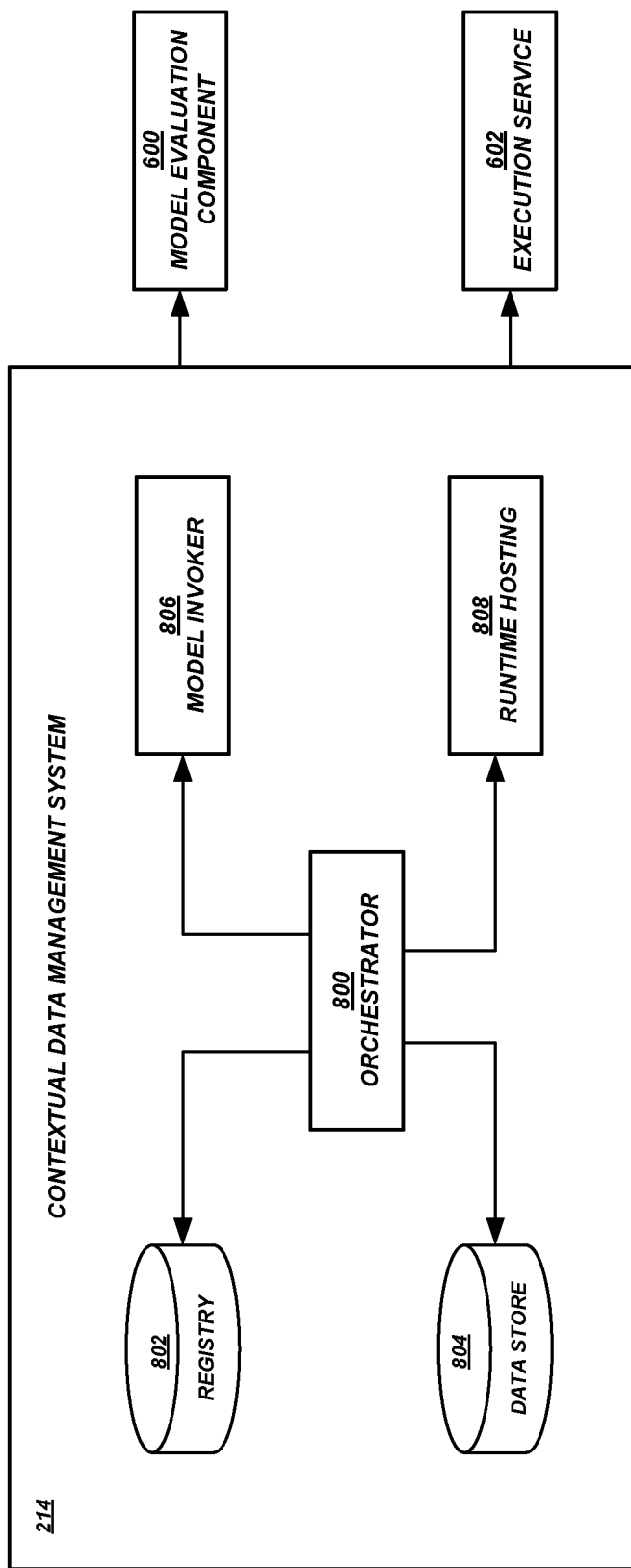
FIG. 8 is a diagram of illustrative data flows and interactions between components of a contextual data management system and other components of a speech processing system according to some embodiments.

At block 708, the contextual data management system 214 can evaluate the initial data and any data generated or obtained in connection with prior iterations of the process 700 during processing of the current utterance (collectively, the "currently-available data") to determine one or more contextual data actions to be performed. In some embodiments, as shown in FIG. 8, the contextual data management system 214 may include a registry 802 of contextual data actions to be performed using the currently-available data.

For example, if the currently-available data includes geolocation data and a user profile identifier, the registry may indicate that a contextual data item is to be generated representing whether the user is at their home. As another example, if the currently-available data includes preliminary NLU results, the registry may indicate that a contextual data item is to be generated representing whether the user is likely making an utterance that is a continuation of a prior utterance (e.g., a refinement of a search) or unrelated to any prior utterance (e.g., an entirely new search).

The mechanism by which the registry 802 indicates the contextual data actions to be performed may be based on data or function signatures, such as those including annotations. In some embodiments, the registry may store a listing of function signatures (e.g., Java function signatures) decorated with annotations to indicate data on which the functions are dependent (e.g., data that must be currently available to execute the function). When an integration point is triggered, an orchestrator component 800 of the contextual data management system 214 may review data in the registry 802 and find any functions that are able to be executed using the currently-available data.

At decision block 710, the orchestrator 800 or some other component of the contextual data management system 214 may determine whether to prefetch data using the currently-available data. If so, the process 700 may proceed to block 712. Otherwise, the process 700 may proceed to decision block 714.

At block 712, the orchestrator 800 or some other component of the contextual data management system 214 can initiate prefetching of a contextual data item using the currently-available data. For example, the orchestrator 800 may perform a gazetteer lookup using one or more of the currently-available data items. In some embodiments, the results of the lookup may be stored in an internal data store 804, where it is maintained as currently-available data item for future contextual data generation processes and/or provided to other components of the speech processing system 100 during subsequent processing (e.g., for routing determinations). In some embodiments, the results of the lookup may be stored in a processing data store 218 external to the contextual data management system 214, where it is made accessible to other components of the speech processing system 100 during subsequent processing (e.g., for routing determinations).

In some embodiments, the process 700 may proceed asynchronously. For example, after initiating one or more prefetching operations in block 712, the process 700 may proceed to decision block 714 without necessarily waiting for the prefetching operation(s) to complete. When the prefetching operation(s) initiated in block 712 have completed, the process 700 may proceed to decision block 718 potentially in parallel with, or asynchronous to, the execution of decision block 714, block 716, etc.

At decision block 714, the orchestrator 800 or some other component of the contextual data management system 214 may determine whether to precompute data using the currently-available data. If so, the process 700 may proceed to block 716. Otherwise, the process 700 (or one thread of execution thereof) may terminate at block 720.

At block 716, the contextual data management system 214 can initiate precomputation of a contextual data item using the currently-available data. The precomputed contextual data item may be stored in the data store 804 internal to the contextual data management system 214, or in a processing data store 218 external to the contextual data management system 214. In some embodiments, a model invoker 806 may use a model or cause an external model evaluation component 600 to use a model, such as a machine learning model or other probabilistic model, to evaluate one or more currently-available data items and make a prediction, classification, or the like. For example, the model invoker 806 may generate a classification of the currently-available data as indicative of a search refinement or a new search. In some embodiments, a runtime hosting environment 808 may precompute a contextual data item or cause an external execution service 602 to precompute the contextual data item. For example, the runtime hosting environment 808 may obtain scores for the top two intents of an N-best list, and compute a difference between the scores. As another example, an external execution service 602 may precompute embeddings, such as Bidirectional Encoder Representations from Transformers ("BERT") embeddings, that will be used by subsequent processes.

In some embodiments, the process 700 may proceed asynchronously. For example, after initiating one or more precomputation operations in block 716, one thread of execution of the process 700 may terminate at block 720 without necessarily waiting for the precomputation operation(s) to complete. When the precomputation operation(s) initiated in block 716 have completed, the process 700 may proceed to decision block 718 potentially in parallel with, or asynchronous to, the execution other portions of the process 700.

At decision block 718 the orchestrator 800 or some other component of the contextual data management system 214 can determine whether there is further contextual data to prefetch and/or precompute based on data prefetched and/or precomputed during the current iteration of the process 700. If so, the process 700 may return to block 708. Otherwise, the process 700 may terminate.

In some embodiments, the process 700 may be conceptualized as building a data graph in which initial data is obtained, additional data is fetched, computed, or otherwise generated based on the available data, and then further data is fetched, computed, or otherwise generated based on the additional data, and so on. In this way, the process 700 may be a recursive process in which a single integration point causes expansion of the data graph by multiple data items, levels, etc. In some embodiments, a prior recursive instance of the process 700 may be ongoing when a subsequent integration point during utterance processing is reached and another instance of the process 700 is invoked. In this way, the process 700 may be performed in parallel or otherwise asynchronously with respect to other instances of the same process 700.

Returning to FIG. 6, an intra-domain routing system 216 may, in response to a confidence request received at [V], obtain contextual data items at [VI] for use in generating routing confidence evaluations, as described in greater detail above. Once a routing decision has been made, an application 282 may be assigned at [VII] to generate a response to the utterance. In some embodiments, the application 282 may access contextual data items at [VIII] as part of response generation process or otherwise during the course of management a customer experience (e.g., during a multi-turn dialog).

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read data from, and write data to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
    as performed by a computing system comprising one or more computer processors configured to execute specific instructions,
        executing a set of natural language processing actions on natural language input to generate intent data, wherein the natural language input represents a user utterance, wherein the intent data comprises a semantic representation of the user utterance, and wherein an initial natural language processing data item is generated or obtained during the set of natural language processing actions;
        determining, at an integration point during the set of natural language processing actions at which the initial natural language processing data item is generated or obtained, to generate a contextual data item using the initial natural language processing data item;
        generating the contextual data item based at least partly on the initial natural language processing data item concurrently with performance of at least a portion of the set of natural language processing actions;
        obtaining, by an intra-domain routing system, a plurality of routing confidence evaluations generated using the contextual data item and a plurality of different routing confidence providers associated with a domain, wherein individual routing confidence providers are external to the intra-domain routing system and are associated with different respective applications of a plurality of different applications, wherein a first routing confidence evaluation is generated using a set of deterministic rules, and wherein a second routing confidence evaluation is generated using a nondeterministic model; and
        determining, by the intra-domain routing system, an application to which the intent data is to be routed for generation of a response to the user utterance based on the plurality of routing confidence evaluations.

2. The computer-implemented method of claim 1, further comprising determining, using a registry, a contextual data action to be performed to generate the contextual data item, wherein the registry specifies the contextual data action and one or more initial data items to be used to generate the contextual data item.

3. The computer-implemented method of claim 1, further comprising:
    determining, at a second integration point during the set of natural language processing actions, to generate a second contextual data item using a second initial data item; and
    generating the second contextual data item based at least partly on the second initial data item concurrently with performance of at least a second portion of the set of natural language processing actions.

4. The computer-implemented method of claim 1, further comprising:
    in response to generating the contextual data item, determining to generate a second contextual data item using the contextual data item; and
    generating the second contextual data item based at least partly on the contextual data item concurrently with performance of at least a second portion of the set of natural language processing actions.

5. The computer-implemented method of claim 1, wherein generating the contextual data item based at least partly on the initial natural language processing data item comprises evaluating the initial natural language processing data item using a model to generate a prediction regarding an aspect of the user utterance.

6. The computer-implemented method of claim 5, further comprising generating a response to the user utterance based at least partly on the prediction, wherein the prediction relates to a likely status of the user utterance as one of an initial user utterance of a multi-turn dialog or a follow-up user utterance of a multi-turn dialog.

7. The computer-implemented method of claim 1, further comprising storing the contextual data item in a data store accessible during performance of the at least one of the set of natural language processing actions, or a set of response determination actions.

8. The computer-implemented method of claim 1, further comprising responding to a request for the contextual data item during performance of the at least one of the set of natural language processing actions, or a set of response determination actions.

9. The computer-implemented method of claim 1, wherein the first routing confidence evaluation is obtained from a first routing confidence provider in parallel with obtaining, from a second routing confidence provider, the second routing confidence evaluation.

10. A system comprising:
computer-readable memory storing executable instructions; and
one or more processors in communication with the computer-readable memory and configured by the executable instructions to at least:
execute a set of natural language processing actions on natural language input to generate intent data, wherein the natural language input represents a user utterance, wherein the intent data comprises a semantic representation of the user utterance, and wherein an initial natural language processing data item is generated or obtained during the set of natural language processing actions;
determine, at an integration point during the set of natural language processing actions at which the initial natural language processing data item is generated or obtained, to generate a contextual data item using the initial natural language processing data item;
generate the contextual data item based at least partly on the initial natural language processing data item concurrently with performance of at least a portion of the set of natural language processing actions;
obtain a plurality of routing confidence evaluations generated using the contextual data item and a plurality of routing confidence providers associated with a domain, wherein a first routing confidence provider generates a first routing confidence evaluation using a set of deterministic rules, and wherein a second routing confidence provider generates a second routing confidence evaluation using a nondeterministic model; and
determine an application to which the intent data is to be routed for generation of a response to the user utterance based on the plurality of routing confidence evaluations.

11. The system of claim 10, wherein the one or more processors are configured by further executable instructions to determine, using a registry, a contextual data action to be performed to generate the contextual data item, wherein the registry specifies the contextual data action and one or more initial data items to be used to generate the contextual data item.

12. The system of claim 10, wherein the one or more processors are configured by further executable instructions to at least:

determine, at a second integration point during the set of natural language processing actions, to generate a second contextual data item using a second initial data item; and
generate the second contextual data item based at least partly on the second initial data item concurrently with performance of at least a second portion of the set of natural language processing actions.

13. The system of claim 10, wherein the one or more processors are configured by further executable instructions to at least:
in response to generating the contextual data item, determine to generate a second contextual data item using the contextual data item; and
generate the second contextual data item based at least partly on the contextual data item concurrently with performance of at least a second portion of the set of natural language processing actions.

14. The system of claim 10, wherein the one or more processors configured to generate the contextual data item based at least partly on the initial natural language processing data item are configured by further executable instructions to evaluate the initial natural language processing data item using a model to generate a prediction regarding an aspect of the user utterance.

15. The system of claim 14, wherein the one or more processors are configured by further executable instructions to generate a response to the user utterance based at least partly on the prediction, wherein the prediction relates to a likely status of the user utterance as one of an initial user utterance of a multi-turn dialog or a follow-up user utterance of a multi-turn dialog.

16. The system of claim 10, wherein the one or more processors are configured by further executable instructions to store the contextual data item in a data store accessible during performance of the at least one of the set of natural language processing actions, or a set of response determination actions.

17. The system of claim 10, wherein the one or more processors are configured by further executable instructions to respond to a request for the contextual data item during performance of the at least one of the set of natural language processing actions, or a set of response determination actions.

18. The system of claim 10, wherein the initial natural language processing data item comprises an entity resolved during the set of natural language processing actions.

19. The system of claim 10, wherein the one or more processors are configured by further executable instructions to identify the plurality of routing confidence providers associated with the domain based at least partly on an association of individual routing confidence providers with individual semantic representations of a plurality of semantic representations.

* * * * *